United States Patent [19]

Takenaka et al.

[11] Patent Number: 5,404,086
[45] Date of Patent: Apr. 4, 1995

[54] SYSTEM FOR CONTROLLING LOCOMOTION OF LEGGED MOBILE ROBOT AND CORRECTING INCLINOMETER'S OUTPUT THEREOF

[75] Inventors: Toru Takenaka; Yoshimi Furukawa, both of Saitama, Japan

[73] Assignee: Honda Giken Kogyo Kabushiki Kaisha, Tokyo, Japan

[21] Appl. No.: 94,364

[22] Filed: Jul. 20, 1993

[30] Foreign Application Priority Data

Jul. 20, 1992 [JP] Japan .................................. 4-214605
Jul. 20, 1992 [JP] Japan .................................. 4-214606

[51] Int. Cl.⁶ .............................................. G05B 19/00
[52] U.S. Cl. .......................... 318/568.12; 318/568.11; 901/1
[58] Field of Search ................... 318/560–646; 395/80–99; 180/8.01–8.07; 901/1, 3, 5, 7, 9, 12, 13, 15–23

[56] References Cited

U.S. PATENT DOCUMENTS

| | | | |
|---|---|---|---|
| 5,151,859 | 9/1992 | Yoshino et al. | 364/424.02 |
| 5,206,569 | 4/1993 | Ozawa | 318/568.12 |
| 5,221,883 | 6/1993 | Takenaka et al. | 318/568.12 |
| 5,239,246 | 8/1993 | Kim | 318/568.11 |
| 5,252,901 | 10/1993 | Ozawa et al. | 318/568.12 |
| 5,255,753 | 10/1993 | Nishikawa | 180/8.6 |
| 5,311,109 | 5/1994 | Ozawa | 318/568.11 |

FOREIGN PATENT DOCUMENTS 62-97005  5/1987  Japan .
63-150176 6/1988  Japan .
31-84782  8/1991  Japan .

OTHER PUBLICATIONS

"Robotics Handbook", Robotic Society of Japan, Published Oct. 20, 1990.
English language abstracts of JP applications 62-97005 & 3-184782.

*Primary Examiner*—Paul Ip
*Attorney, Agent, or Firm*—Lyon & Lyon

[57] ABSTRACT

In the control of legged mobile robot, a desired walking pattern (gait) is usually preestablished supposing a floor such that the robot walks on the floor. However, if a floor on which the robot walks actually is not the same as the supposed floor so that there is an angular therebetween, floor reaction force is not the same as that desired, causing the locomotion stable. Therefore, the error is estimated and the desired walking pattern is corrected in response to the error such that the floor reaction force becomes as desired. Namely, the robot's possible floor contact portion's position is firstly calculated on the assumption that the robot does not exhibit any compliance behavior including mechanical deformation intrinsically assigned thereto and a plane which wholly or partly includes or has the possible floor contact portion's position, is presumed. Then an angle formed by the virtual plane and the supposed floor is presumed. And floor reaction force is controlled through the angle and the desired walking pattern is corrected such that floor reaction force becomes as desired. The error is similarly used to correct output of an inclinometer equipped on the robot.

26 Claims, 25 Drawing Sheets

FIG. 5A
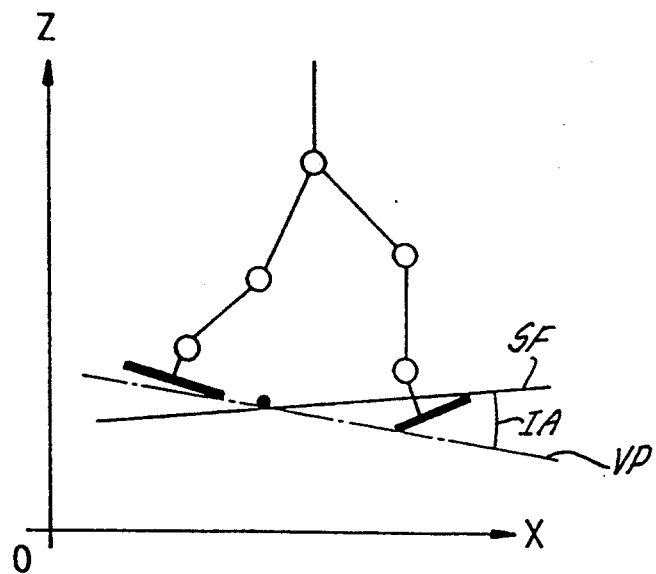
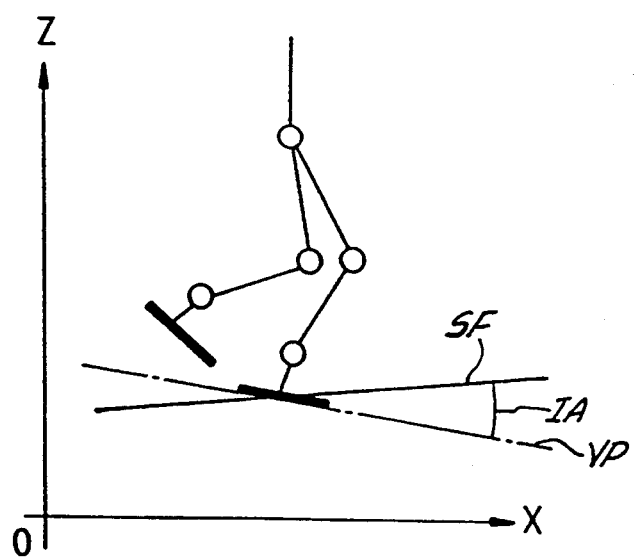
FIG. 5B

FIG. 15

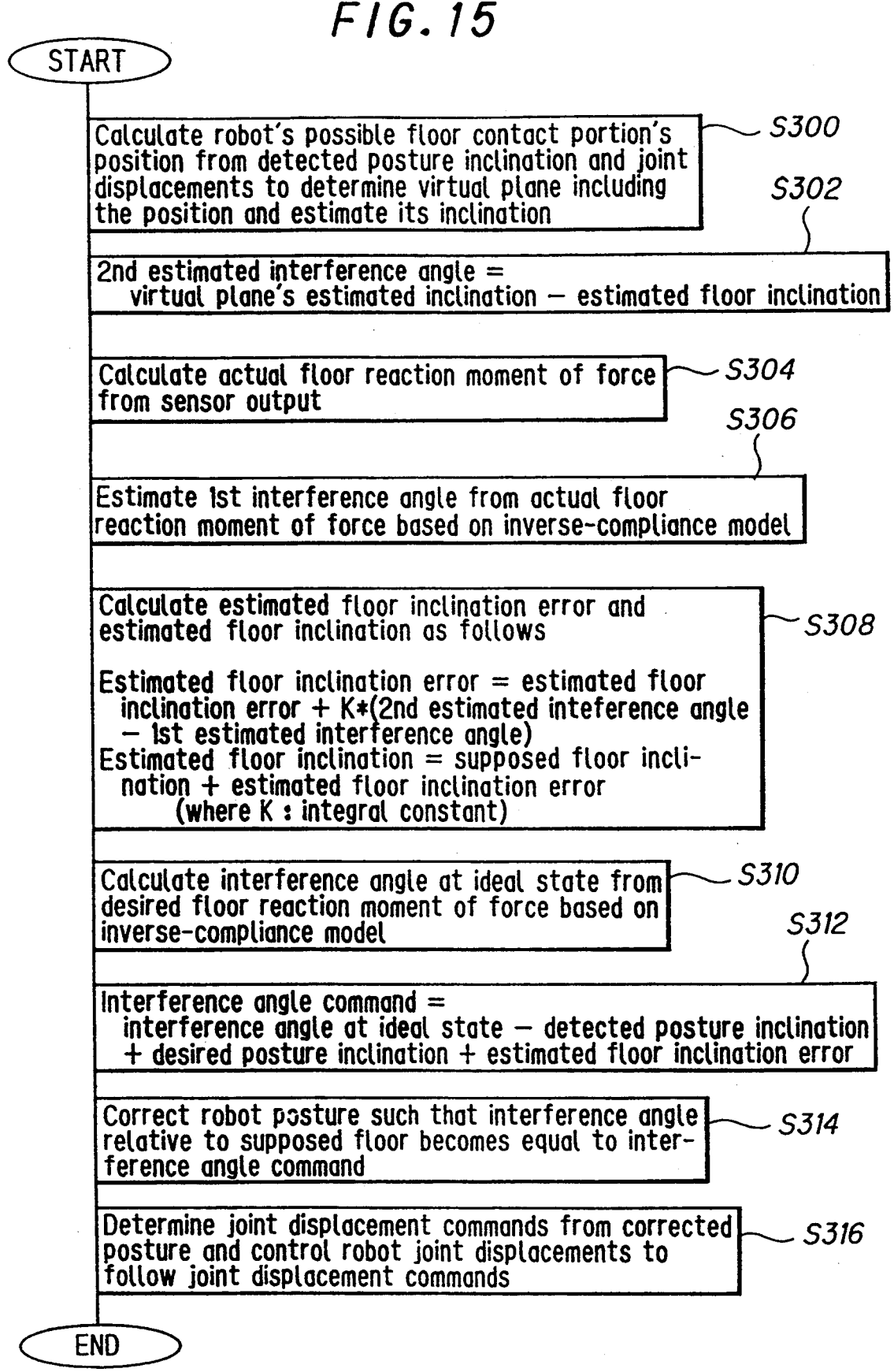

START

S300 — Calculate robot's possible floor contact portion's position from detected posture inclination and joint displacements to determine virtual plane including the position and estimate its inclination

S302 — 2nd estimated interference angle = virtual plane's estimated inclination − estimated floor inclination

S304 — Calculate actual floor reaction moment of force from sensor output

S306 — Estimate 1st interference angle from actual floor reaction moment of force based on inverse-compliance model

S308 — Calculate estimated floor inclination error and estimated floor inclination as follows Estimated floor inclination error = estimated floor inclination error + K∗(2nd estimated inteference angle − 1st estimated interference angle)
Estimated floor inclination = supposed floor inclination + estimated floor inclination error
  (where K : integral constant)

S310 — Calculate interference angle at ideal state from desired floor reaction moment of force based on inverse-compliance model

S312 — Interference angle command = interference angle at ideal state − detected posture inclination + desired posture inclination + estimated floor inclination error

S314 — Correct robot posture such that interference angle relative to supposed floor becomes equal to interference angle command

S316 — Determine joint displacement commands from corrected posture and control robot joint displacements to follow joint displacement commands

END

SYSTEM FOR CONTROLLING LOCOMOTION OF LEGGED MOBILE ROBOT AND CORRECTING INCLINOMETER'S OUTPUT THEREOF

BACKGROUND OF THE INVENTION

1. Field of the Invention

This invention relates to a locomotion control system for a legged mobile robot and more particularly to a system in which an inclinatory angle of a floor on which the robot actually walks is estimated and an error or deviation between the floor and a floor supposed in a desired walking pattern (gait) such that the robot walks thereon, is calculated, and the posture of the robot is corrected such that floor reaction force acting to the robot does not shift, which would otherwise occur due to the error, from that desired. And this invention further relates to a system for correcting an output of an inclinometer mounted on the legged robot also utilizing the error thus determined.

2. Description of the Prior Art

Legged mobile robots, in particular legged mobile robots using biped locomotion, are taught by Japanese Laid-open Patent Publication Nos. 62(1987)-97005 and 63(1988)-150176. A general discussion of robots including this type of robots can be found in Robotics Handbook, Robotic Society of Japan, published on Oct. 20, 1990.

The stability of legged mobile robots, in particular legged mobile robots using biped locomotion, is intrinsically low. Because of this, the assignee proposed earlier a technique in which a mechanical compliance mechanism was provided at the robot's individual feet and moment of force acting to the robot was detected by a sensor and was controlled to a predetermined value, in Japanese Patent Application No. 4(1992)-137881 filed on Apr. 30, 1993 which was also filed in the United States on Apr. 19, 1993 under the number of 08/049494. Further, the assignee proposed another technique in which the ZMP (zero moment point) was detected and when it was found to be out of a desired position, the robot feet were driven on a floor in opposite directions such that the error was decreased, in Japanese Patent Application No. 4(1992)-137884 filed on Apr. 30, 1992 which was also filed in the United States on Apr. 30, 1993 under the Ser. No. of 08/056067. In the technique, the robot was thus approximated as an inverted pendulum and was controlled to walk stably on a floor. Furthermore, the assignee proposed a technique in which a feedback correction was applied to the control just mentioned above in response to the robot body's posture inclination (inclinatory angle) so as to enhance the posture stability, in Japanese Patent Application No. 4(1992)-137885 filed on Apr. 30, 1990, whose content was included in the U.S. application Ser. No. 08/056067 referred to in the above.

In the control of a legged mobile robot, a desired walking pattern (gait) is preestablished in terms of positions/orientations of the feet and hip joints etc. such that it satisfies dynamic equilibrium. In the techniques earlier proposed, posture inclination of the robot converges on a desired value expected in the desired walking pattern provided that the configuration such as inclinatory angle of a floor supposed in the desired walking pattern coincides with that of a floor on which the robot is actually walking and at the time of walking no disturbance exists. The floor supposed in the desired walking pattern is hereinafter referred to as "supposed floor". More specifically, when calling a deviation or error between the actual and desired posture inclination as "posture inclination control error", the error converges to zero. However, if the actual floor is not the same as the floor supposed in configuration, namely if there is a configuration error therebetween, the error becomes a disturbance, resulting the posture inclination control error to happen. For example, when there is an inclination error between the actual and supposed floors, if the posture inclination feedback control is conducted using PD control laws, there remains a steady-state error in proportion to the inclination error.

This will be explained with reference to FIGS. 26 and 27. As illustrated in FIG. 26, let is be presumed that the actual floor AF inclines by an angle $\theta$ floor ($\Theta 2$) while the supposed floor SF is level and hence the robot body's inclination shifts in the direction of arrow A1 from a desired posture inclination by an angle $\theta 4$. The robot's ankle joint is then driven in the direction shown in the figure by an amount $\theta \cdot K$ made ($\Theta 6$) up of the detected $\theta 4$ multiplied by a proportional gain K such that the ankle is bent by the amount as illustrated in FIG. 27. As a result, although the robot posture is restored in the direction of arrow A2 to stable state, there still remains a steady-state error ($\theta 8$) offset, as shown. Namely, from geometric relationship between the robot and floor, Ankle joint's bending angle = $\theta$floor $-$ $\theta$offset And in the steady-state, from the feedback control laws Ankle joint's bending angle = $K \cdot \theta$offset Hence, $\theta$offset = $\theta$floor/$(K+1)$ Here, if the proportional gain K is set to be infinite, the steady-state error will almost be zero. Since, however, the proportional gain K is a finite value, the error still remains as a finite value. The steady-state error will nevertheless be decreased to zero by the following methods. 1. To use integral type control law such as PID or I-PD in the posture inclination control. 2. To configure the control as torque control in which external force acting to the robot legs is detected and is fed back to ankle joint displacement command using integral type control law such as PID or I-PD.

The methods are however disadvantageous in that the integral element, if used, results a delay in the open-loop transfer function, making the system unstable. That is, a phase lag will occur and the system will be liable to vibrate.

The same purpose can be achieved by using more conventional methods listed as follows.

3. Cutting ankle joint displacement's feedback and to configure the ankle joint control as torque control.

4. To configure the ankle joint control as joint motor's current control

Since methods 3 and 4 do not utilize displacement control, they are free from floor configuration variations such as inclination, difference in level or bumps. However, if method 3 or 4 is used, it has to be switched to displacement control during robot's free leg phase and what is worse, an impact may often occur at the transition.

The object of the invention is therefore to eliminate the aforesaid shortcomings of the prior art and to provide a locomotion control system for a legged mobile robot in which the aforesaid floor configuration error is estimated and robot posture is corrected such that floor reaction force does not shift, which would otherwise occur due to the configuration error, from that desired.

Another object of the invention is to provide a locomotion control system for a legged mobile robot in which the floor configuration error is estimated and in response thereto, the robot is controlled in an appropriate manner such as to cease its locomotion.

Further object of the invention is to provide a locomotion control system for a legged mobile robot in which a steady-state error in the robot's posture inclination control is substantially decreased, without degrading the stability of the control, to zero.

Aside from the above, a legged mobile robot is usually equipped with an inclinometer for detecting the posture inclination of the robot. The inclinometer is categorized to three types. First typed one has a detector for detecting inclinatory angular velocity and estimates inclinatory angle by integrating the detector's outputs. Second typed one detects inclinatory angle using a detector for gravitational direction and the third typed one is the combination of the first and second typed inclinometers. Among them, the first type of the inclinometer is disadvantageous in that estimation error is liable to grow if the detector's output drifts. The second typed one is advantageous in that estimation error does not increase, but is disadvantageous in that detection error may vary due to the occurrence of temperature drift in the gravitational direction's detector or influence of inertial force resulting from the robot's acceleration/deceleration motion. The last type of the inclinometer aims to cancel the drawbacks of the first and second typed ones and is free from the error's increase and the influence from inertial force is considerably decreased. However, the influence of the temperature drift is never eliminated.

Still further object of the invention is therefore to eliminate the drawbacks of the prior art and to provide a system for correcting an output of an inclinometer mounted on the legged mobile robot in which the robot's posture relative to a known floor configuration is estimated to determine the robot's posture inclination and based thereon, the inclinometer's output is corrected with accuracy.

SUMMARY OF THE INVENTION

In order to achieves the objects, the invention provides a system for controlling locomotion of a legged mobile robot having a body and a plurality of legs each connected to the body, comprising first means for modeling the robot as a rigid linkage mechanism and establishing desired walking pattern supposing a floor such that the robot walks on the supposed floor, second means for detecting actual inclination of the robot posture when the robot walks, third means for determining the posture of the robot at least from the detected actual inclination of the robot posture on the assumption that the robot does not exhibit compliance behavior intrinsically assigned thereto, fourth means for determining a relative relationship between the determined robot posture and the supposed floor, fifth means for estimating, in accordance with a predetermined characteristic, floor reaction force which could act to the robot should the robot change its posture by virtue of the compliance behavior intrinsically assigned thereto such that at least a possible floor contact portion is in contact with the supposed floor, sixth means for detecting floor reaction force that actually acts to the robot, seventh means for determining an error between the estimated floor reaction force and the detected actual floor reaction force, and eighth means for correcting the supposed floor in response to the determined error.

BRIEF DESCRIPTION OF THE DRAWINGS

The above and other objects and advantages of the invention will be more apparent from the following description and drawings, in which:

FIGS. 5A and 5B are views explaining the interference angle referred to in FIGS. 3 and 4;

FIG. 15 is a flow chart showing the operation of the system illustrated in FIG. 14;

DETAILED DESCRIPTION OF THE PREFERRED EMBODIMENTS

Embodiments of the invention will now be explained taking a biped robot as an example of a legged mobile robot.

Figure 1:
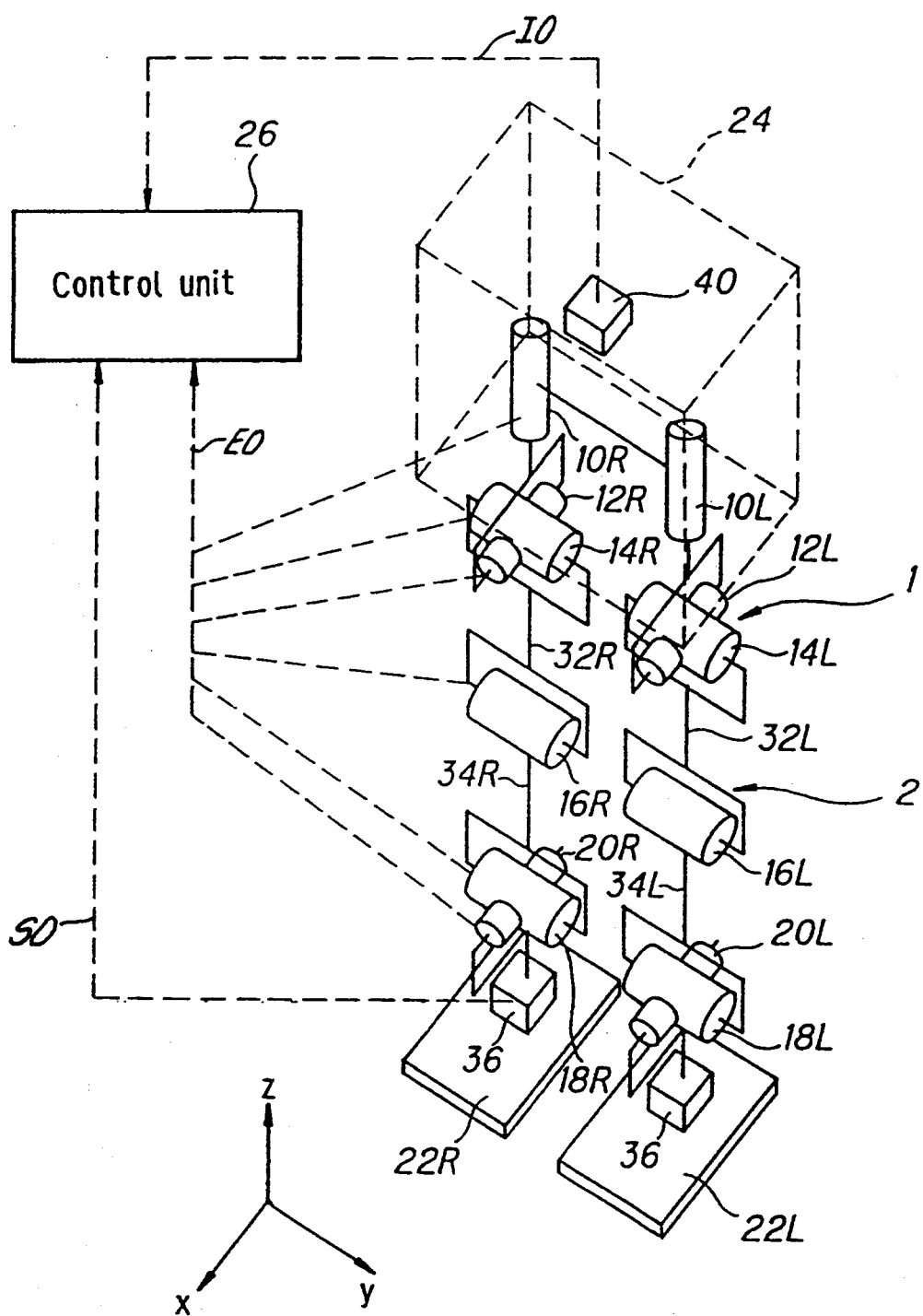
FIG. 1 is an overall view showing a locomotion control system for a legged mobile robot and an inclinometer's output correction system according to the invention.

FIG. 1 is an overall skeleton view of a locomotion control system for a legged mobile robot and an inclinometer's output correction system according to the invention. In the figure, a robot 1 has left and right legs 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a body (trunk) 24 is provided at the upper end, which houses electronic components such as a control unit 26 made up of a microcomputer.

The hip joints in the foregoing structure are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L. The legs 2 thus have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly with electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the feet and also measuring the moment of force components Mx, My and Mz about the three axes, the six-dimensional force and torque sensor 36 detects whether or not the associated foot has landed and the magnitude and direction of the forces and moment of forces acting to the robot through the supporting leg. The sole of each foot is equipped at its four corners with touchdown switches 38, not illustrated in FIG. 1, of conventional design for detecting whether or not the foot is in contact with the ground. The top of the body 24 is provided with an inclinometer 40 for detecting the robot's inclinatory angle and angular velocity relative to z axis in the x-z and y-z planes. Each electric motor at the individual joints is provided with a rotary encoder for generating rotational information. And, although not illustrated in FIG. 1, the robot 1 is provided with a zero reference switch 42 for calibrating the output of the inclinometer 40 and a limit switch 44 for a fail safe. The outputs SO of the sensors 36 the output IO of the inclinometer 40, the output EO of the rotary encoders and the like are sent to the control unit 26 in the trunk 24, as shown by dashed line in FIG. 1.

Figure 2:
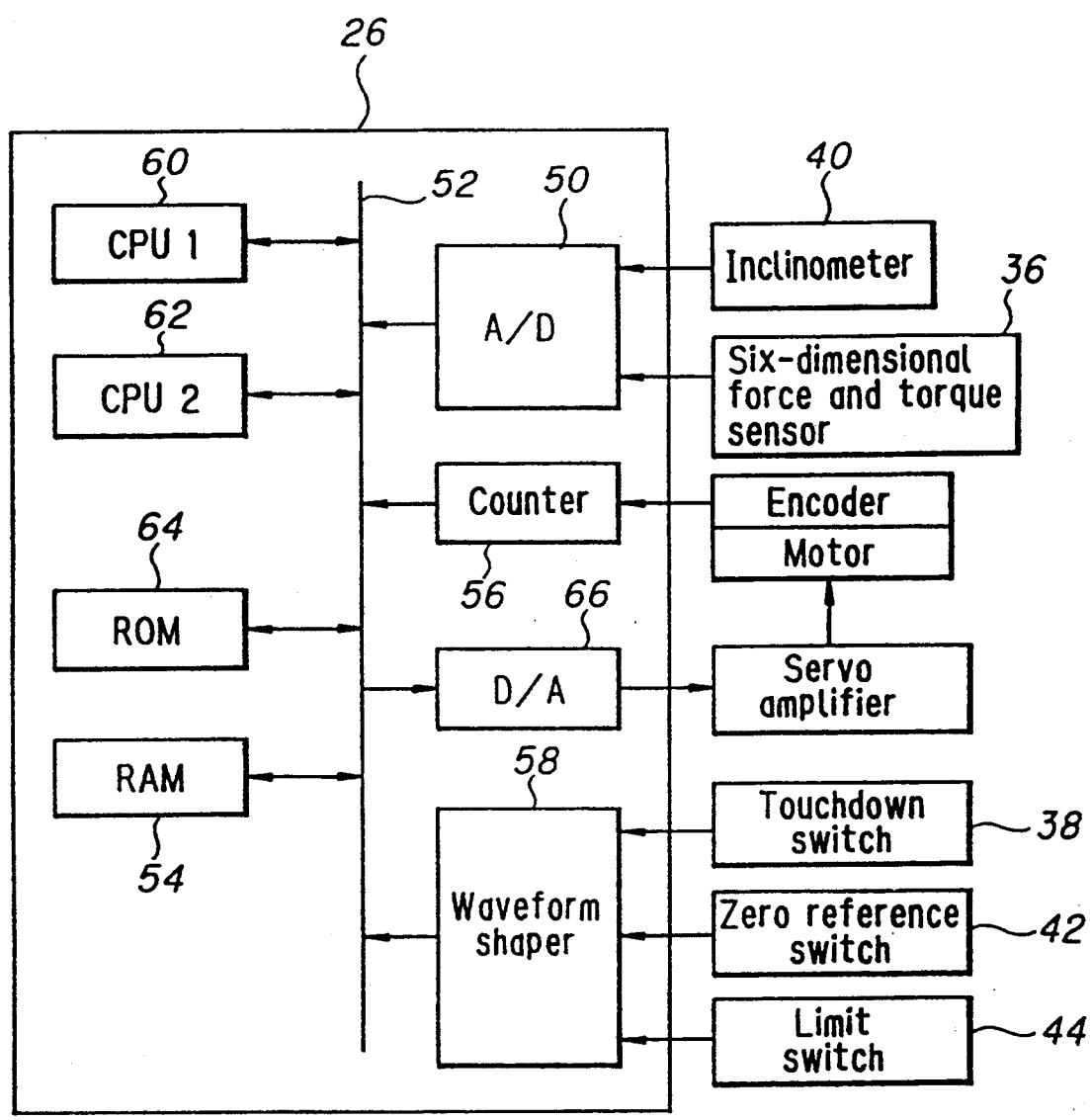
FIG. 2 is a block diagram showing the details of a control unit illustrated in FIG. 1.

As shown in the block diagram of FIG. 2, the control unit 26 has a microcomputer. The outputs from the inclinometer 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 and the like are stored in the RAM 54 via a waveform shaper 58. The control unit has a first processor 60, a second processor 62 and a ROM 64. The first processor 60 conducts inverse kinematic calculations on the basis of a waking pattern (gait) to determine desired joint displacements and outputs the same to the RAM 54. The second processor 62 fetches the desired joint displacements and detected joint displacements from the RAM 54, computes joint displacement commands of the individual joint motors and sends the same to associated servo amplifiers thereof via a D/A converter 66. The robot is intrinsically assigned with any compliance characteristics to exhibit compliance behavior such as proposed by the assignee referred to earlier.

The detailed structure of the system and its operation will now be explained.

Figure 3:
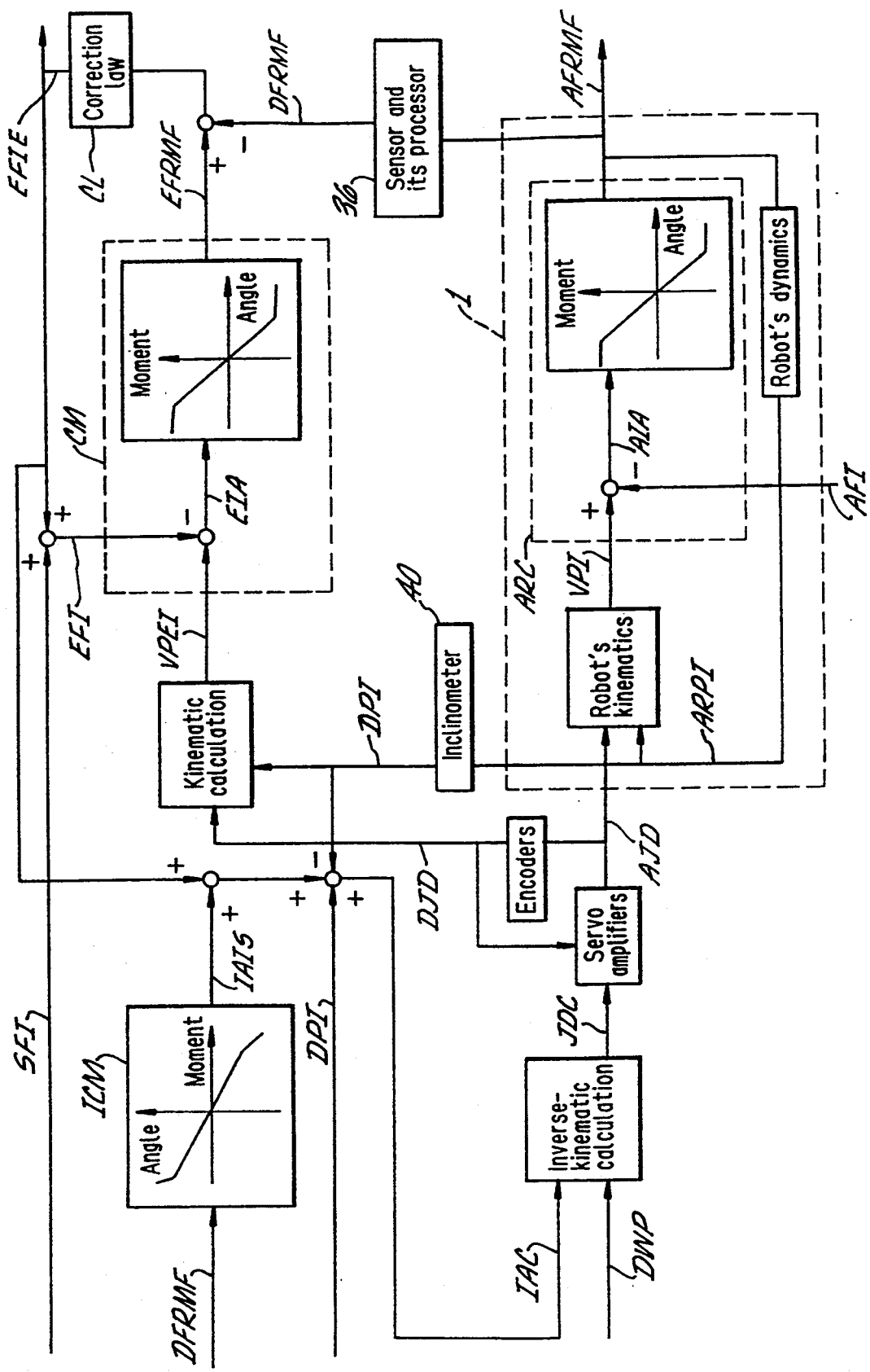
FIG. 3 is a block diagram showing the structure of a locomotion control system according to a first embodiment of the invention.
Figure 4:
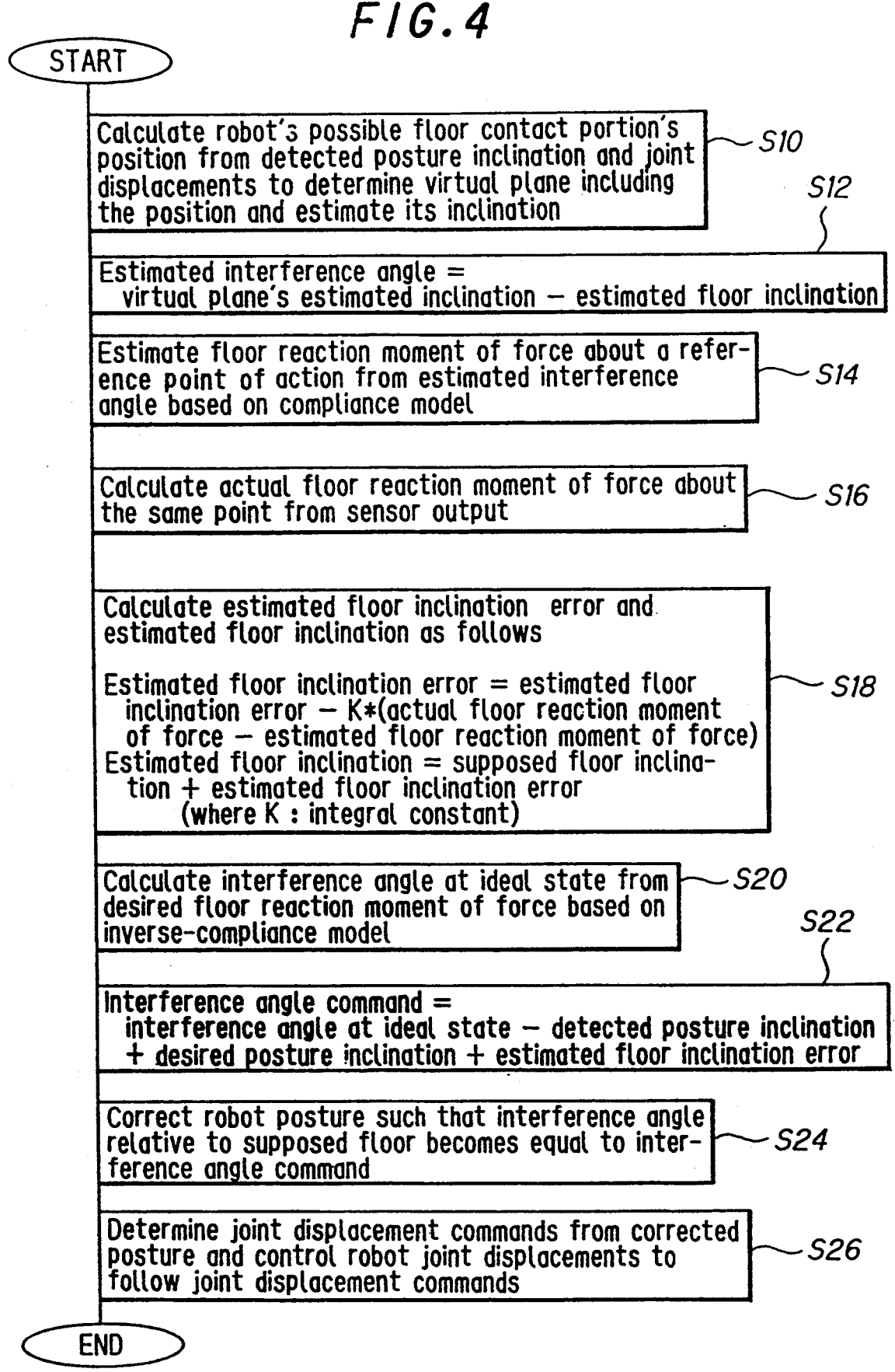
FIG. 4 is a flow chart showing the operation of the system illustrated in FIG. 3.

FIG. 3 is a block diagram showing the structure of the locomotion control system and FIG. 4 is a flow chart showing the operation of the system.

Briefing the system, it is arranged such that a configuration or profile error is estimated between a floor supposed in the desired walking pattern (the aforesaid supposed floor) and a floor on which the robot is actually walking, is estimated in terms of angle and the desired walking pattern is corrected or modified in response to the estimated error.

To be more specific, it is first calculated the robot's possible floor contact portion's position (usually the foot 22 R(L)) on the assumption that the robot does not exhibit any compliance behavior including mechanical deformation intrinsically assigned thereto and a plane which wholly or partly includes or has the possible floor contact portion's position, is presumed. The plane is hereinafter referred to as "virtual plane" VP. Then an angle formed by the virtual plane and the supposed floor SF of the desired walking pattern is presumed. The angle is hereinafter referred to as "interference angle" 1A. FIG. 5A shows the interference angle IA during a two leg support phase and FIG. 5B shows the interference angle IA during a one leg support phase. And floor reaction force is controlled through the interference angle and the desired walking pattern is corrected such that floor reaction force becomes as desired. In other words, maintaining the relative relationship between the possible floor contact portion and the virtual plane, the virtual plane is virtually rotated by an amount in such a manner that robot's posture is corrected such that floor reaction force becomes as desired. The amount of virtual plane's rotation corresponds to the interference angle.

Here, "floor reaction force" is used in the specification to mean force and moment of force acting to the robot through its contact portion(s) at or about a reference point of action and the words "floor reaction force" is sometimes used to means both the force and moment of force.

For that purpose, a model is preestablished which describes the relationship between the interference angle between the robot posture just mentioned, corresponding to the virtual plane, obtained from the detected posture inclination and joint displacements on the assumption that the robot does not exhibit any compliance behavior including mechanical deformation and the supposed floor (or actual floor), and floor reaction force when the robot posture is changed such that the possible floor contact portion is in contact with the supposed floor (or actual floor) by virtue of the compliance behavior including mechanical deformation. The model is hereinafter referred to "compliance model" CM. The structure of the compliance model is simplified as follows.

1. As an input to the model, the interference angle IA is used. The output of the model indicates floor reaction force FRF.

2. The floor reaction force is generally expressed by force acting at a reference point of action and moment of force acting about the same point as was mentioned before. If the reference point of action is set at or in the proximity of desired ZMP in the desired walking pattern, robot posture does not vary even if the force component of the robot reaction force varies. Moreover, since the main purpose of the control under discussion is the robot's posture inclination, the force component of the floor reaction force can therefore be neglected. Accordingly, the model is configured such that it outputs a value only indicative of the moment of force component of the floor reaction force, i.e., floor reaction moment of force.

These will be explained with reference to the flow chart of FIG. 4.

At first step S10, robot's posture inclination DPI and joint displacements DJD are detected through the outputs of the inclinometer and encoders and the robot's possible floor contact portion's position (foot's position) in the absolute coordinate system whose one axis corresponds to the gravitational direction is calculated through kinematic calculation to determine the virtual plane including wholly or partly the possible floor contact portion. And inclination VPEI of the virtual plane is then estimated. It should be noted that the word "posture inclination" is used here to mean an inclination angle of the body 24 relative to the gravitational direction.

Program then advances to step S12 in which a deviation or error between the virtual plane's estimated inclination VPEI and estimated floor inclination EFI, explained later, is calculated and deems the deviation or error as estimated interference angle EIA. Program then advances to step S14 in which based on the aforesaid compliance model, floor reaction moment of force FRF about a reference point of action such as the desired ZMP is estimated from the estimated interference angle.

Figure 6:
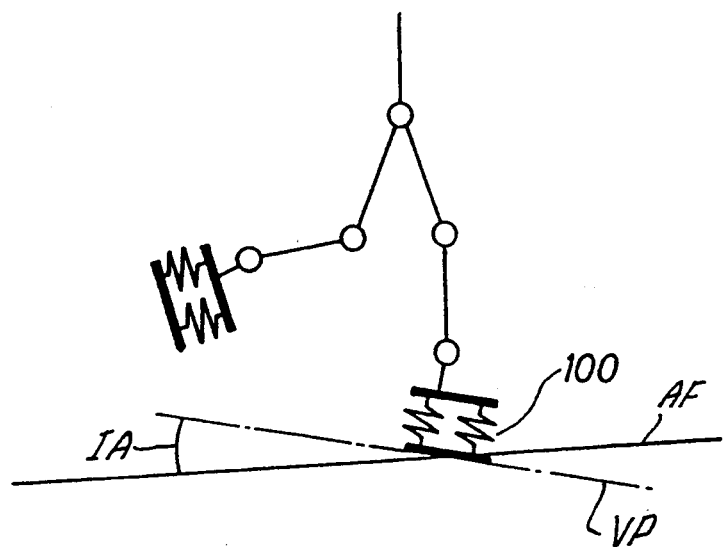
FIGS. 6 and 7 are views explaining the relationship between the operation of the mechanical compliance mechanism proposed earlier by the assignee and the interference angle.
Figure 7:
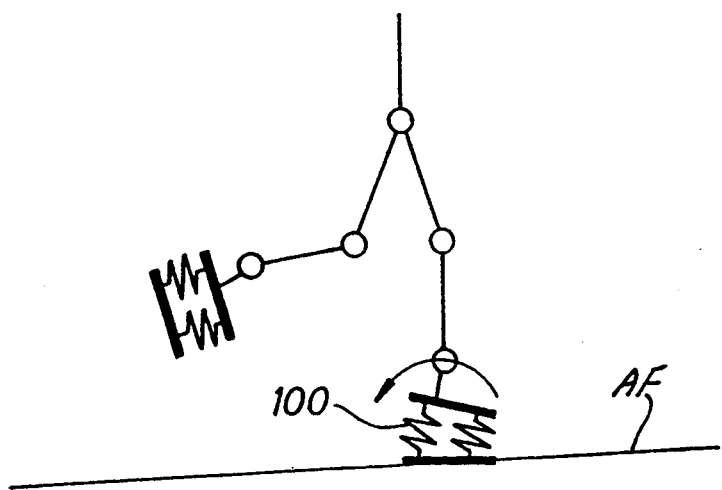

This will be explained with reference to FIGS. 6 to 8. FIG. 6 is an explanatory side view of a robot provided at its ankle with the mechanical compliance mechanism 100 proposed earlier by the assignee in Japanese Patent Application No. 4(1992)-137881 such that there is no deformation (bending) due to compliance. If it is presumed that the robot does not exhibit compliance behavior, a plane (the virtual plane) is determined from the supporting leg's contact portion (foot) and an angular error (the interference angle IA) can be imagined between the plane and the floor AF on which the robot actually is, as illustrated. In fact, the mechanical compliance mechanism 100 operates to bend (deform) by an amount corresponding to the angle (the interference angle) as illustrated in FIG. 7 and floor reaction moment of force occurs. The inventors contemplated this and made the invention. Namely, the inventors considered it possible to express such a configuration error formed between the supposed (or actual) floor and the virtual plane including wholly or partly the robot's contact portion obtained on the assumption that the robot did not exhibit any compliance behavior by the concept named the "interference angle", and inferred that the interference angle could be estimated in a quantitative manner from the floor reaction moment of force and invented the invention.

Figure 8:
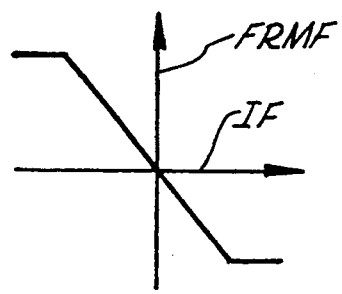
FIG. 8 is a view showing the relationship between the interference angle and floor reaction moment of force.

Such a characteristic showing the relationship between the interference angle IF and floor reaction moment of force FRMF as is illustrated in FIG. 8 is prepared in advance through experiments and is stored in the control unit's memory. At step S14 in the flow chart, floor reaction moment of force is estimated (EFRMF) using this characteristic. For the brevity of, the words "interference angle" and "floor reaction moment of force" of the compliance model CM are simply written as "Angle" and "Moment" in FIG. 3 and on. The same also applies to the characteristic of actual robot's compliance ARC.

It should be noted here that the word "compliance" is used to means "the flexible behavior of a robot or any associated tools in response to external forces" as defined in Subcommittee SC2 (Robots for Manufacturing Environment) in Technical Committee TC184 (Industrial Automation System) in ISO. In that sense, the word "compliance behavior" includes that obtained from a mechanism such as one illustrated in FIGS. 6 and 7 and that obtained by a control such as one proposed by the assignee in Japanese Patent Application No. 4(1992)-137881. Further, the word "compliance behavior" is used here to include any deformation or bending of a portion of the robot such as the links 32, 34 R(L)). In the embodiment, however, since the virtual plane's inclination is estimated using the detected joint displacements, the compliance behavior is substantially limited to that obtained from a mechanism or link or any portion's deformation.

Returning to FIG. 4, program passes to step S16 in which the floor reaction moment of force actually acting about the same point is detected (DFRMF) through the output of the six-dimensional force and torque sensor 36. Program then advances to step S18 in which estimated floor inclination error EFIE is calculated using correction law CL illustrated in the figure. The estimated floor inclination error is an estimation of inclinatory error between the supposed floor inclination SFI and actual floor inclination AFI. As illustrated in the flow chart, the estimated floor inclination error is updated every time the program passes the step. In the same step, the aforesaid estimated floor inclination EFI is then calculated using the value just computed. The correction law may be configured to have the same function as a low-pass filter. In order to decrease an estimation error at steady state to the least, however, the correction law may preferably be configured to have a pure integral element. In the embodiment illustrated, the correction law's transfer function is set to be $-K/S$ (where K: integral constant).

Program then advances to step S20 and on in which the desired walking pattern DWP is corrected such that floor reaction moment of force occurs as desired. Namely, program goes to step S20 in which interference angle at ideal state is calculated from desired floor reaction moment of force DFRMF using another model named inverse-compliance model ICM as illustrated in the upper left of FIG. 3. The inverse-compliance model is assigned with transfer function inverse to that of the aforesaid compliance model as depicted in the figure. More specifically, the invention is premised on an assumption that the robot is assigned with any compliance behavioral characteristics such as at least one among proposed earlier in the applications. As a result, in order for the robot to generate floor reaction moment of force expected in the desired walking pattern, it becomes necessary to add in advance a value corresponding to the compliance behavior intrinsically assigned thereto. For that purpose, the inverse-compliance model is pre-established to determine the additional value. The value is referred to here as the interference angle at ideal state IAIS. Similarly to the aforesaid compliance model, the words "interference angle" and "floor reaction moment of force" in the model are expressed as "Angle" and "Moment" in FIG. 3 and on.

Program then advances to step S22 in which interference angle command is calculated in a manner illustrated. Since abundant moment of force occurs by the amount corresponding to body's inclination error (i.e. angular error between the detected and desired posture inclinations DPI) and the estimated floor inclination error EFIE (i.e., the angular error between the actual and supposed floors), the step aims to cancel this abundant moment of force. Program then advances to step S24 in which the robot posture is corrected such that the interference angle relative to the supposed floor becomes equals to the interference angle command IAC. Specifically, as illustrated in the lower left of FIG. 3, by virtually rotating the possible contact portion in the desired walking pattern DWP by the interference angle a corrected posture is calculated through the inverse-kinematic calculation and joint displacements of the posture thus corrected are then calculated. Program then moves to step S26 in which joint displacement commands JDC are determined for the individual robot joints from the determined joint displacements of the corrected posture and detected joint displacements, and robot joints are controlled to follow the joint displacement commands.

Here, the estimated floor inclination obtained at step S18 is used at S12 in the next program's loop to calculate the estimated interference angle EIA. The estimated interference angle is then used to estimate floor reaction moment of force EFRMF at step S14 and based on the estimated floor reaction moment of force, the estimated floor inclination error EFIE is calculated and updated at step S18. And the estimated floor inclination EFI is again corrected in the same step using the updated estimated floor inclination error. Repeating corrections or updating of the values, one of which is the premise of the other, thus, the estimated floor inclination error converges to zero. In the first program loop, the supposed floor inclination is used as the initial value for the estimated floor inclination and the initial value of estimated floor inclination error is set to be zero.

Figure 9:
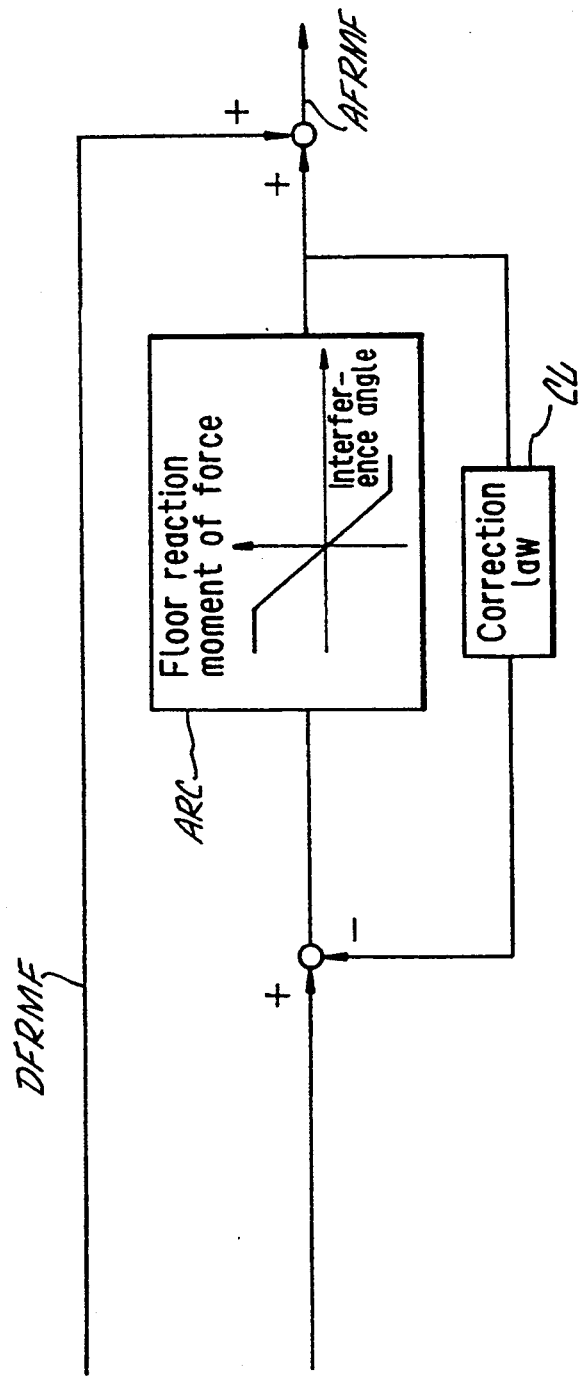
FIG. 9 is a block diagram showing the structure approximating that illustrated in FIG. 3.

With the arrangement, the inclinatory error between the supposed and actual floors is estimated and the desired walking pattern is corrected in response to the inclinatory error. It therefore becomes possible to prevent floor reaction moment of force from being out of, which would otherwise occur due to the inclinatory error, that desired. To be more specific, if it is presumed in the configuration of FIG. 3 that the joint displacement control's gain is set to be high and the actual joint displacements AJD follow faithfully the joint displacement commands JDC, the structure of FIG. 3 can be approximated by that illustrated in FIG. 9. As apparent from the figure, since no element is present between the desired floor reaction moment of force DFRMF and the actual floor reaction moment of force AFRMF, the floor reaction moment of force control is free from the influence of the posture inclination control just mentioned. In other words, even where the desired floor reaction moment of force is manipulated, any element which could bring a phase lag so as to cause the system to be unstable by resulting vibration or the like, is not present from the manipulated variable (desired floor reaction moment of force) to the occurrence of the actual floor reaction moment of force. Since, the correction law, CL on the other hand, includes integral element, $(-K/S)$ if there is the inclinatory error between the supposed and actual floors, the input to the correction law becomes, at the time of settling, zero. As illustrated in FIG. 3, since the outputs of the compliance (compliance model and the actual robot's compliance) are input to the correction law, the compliance outputs converge to zero accordingly. That is, even when there is the inclinatory error between the supposed and actual floors, the steady-state value of the actual floor reaction moment of force is not affected by the error.

It should be noted here that although the desired walking pattern is corrected in response to the inclinatory error, it is not always necessary to correct the desired walking pattern. Because, if it is estimated that the inclinatory error is large, it is possible to conduct other control such as to drive the robot to cease its locomotion.

Figure 10:
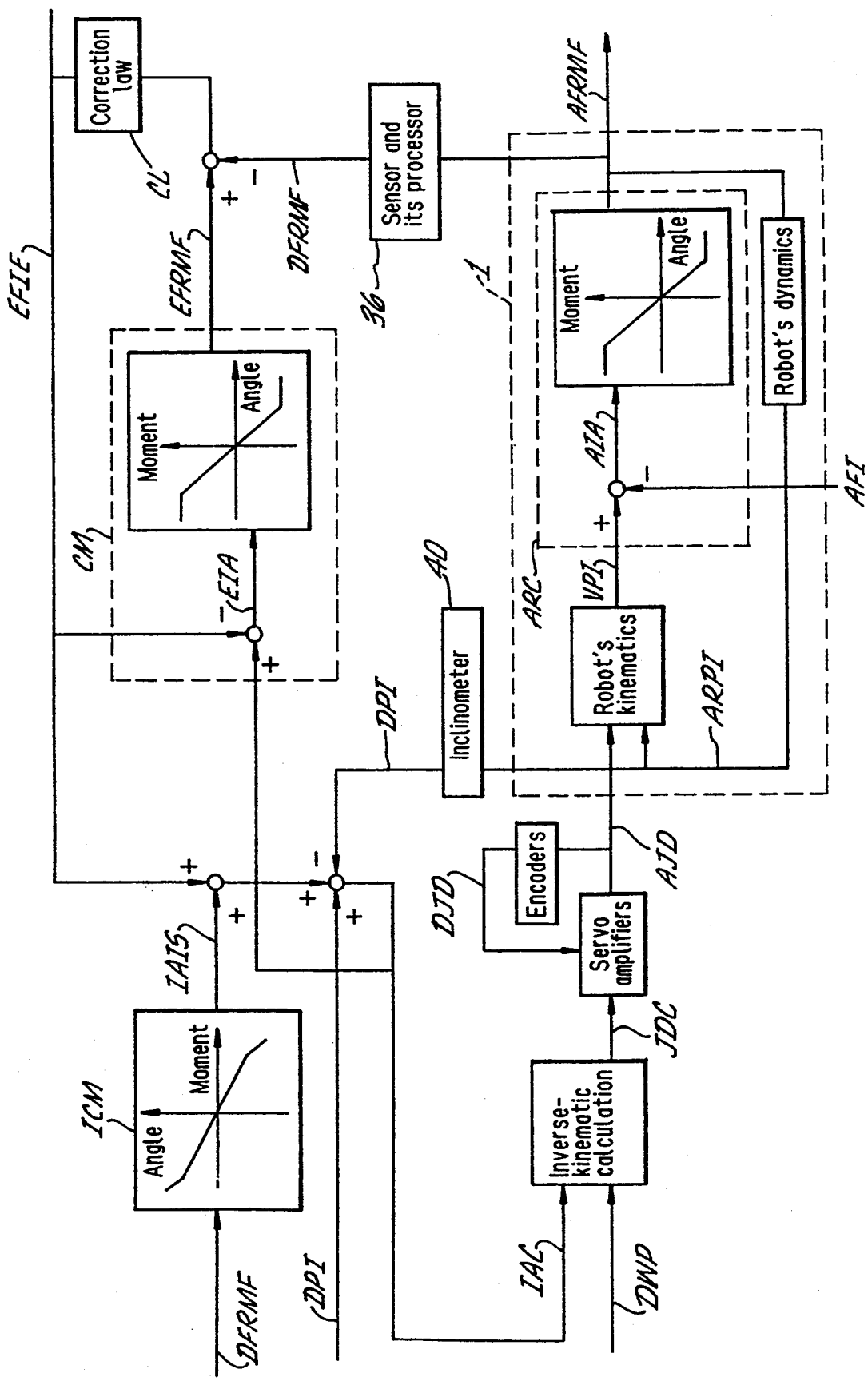
FIG. 10 is a block diagram showing the structure of a locomotion control system according to a second embodiment of the invention.
Figure 11:
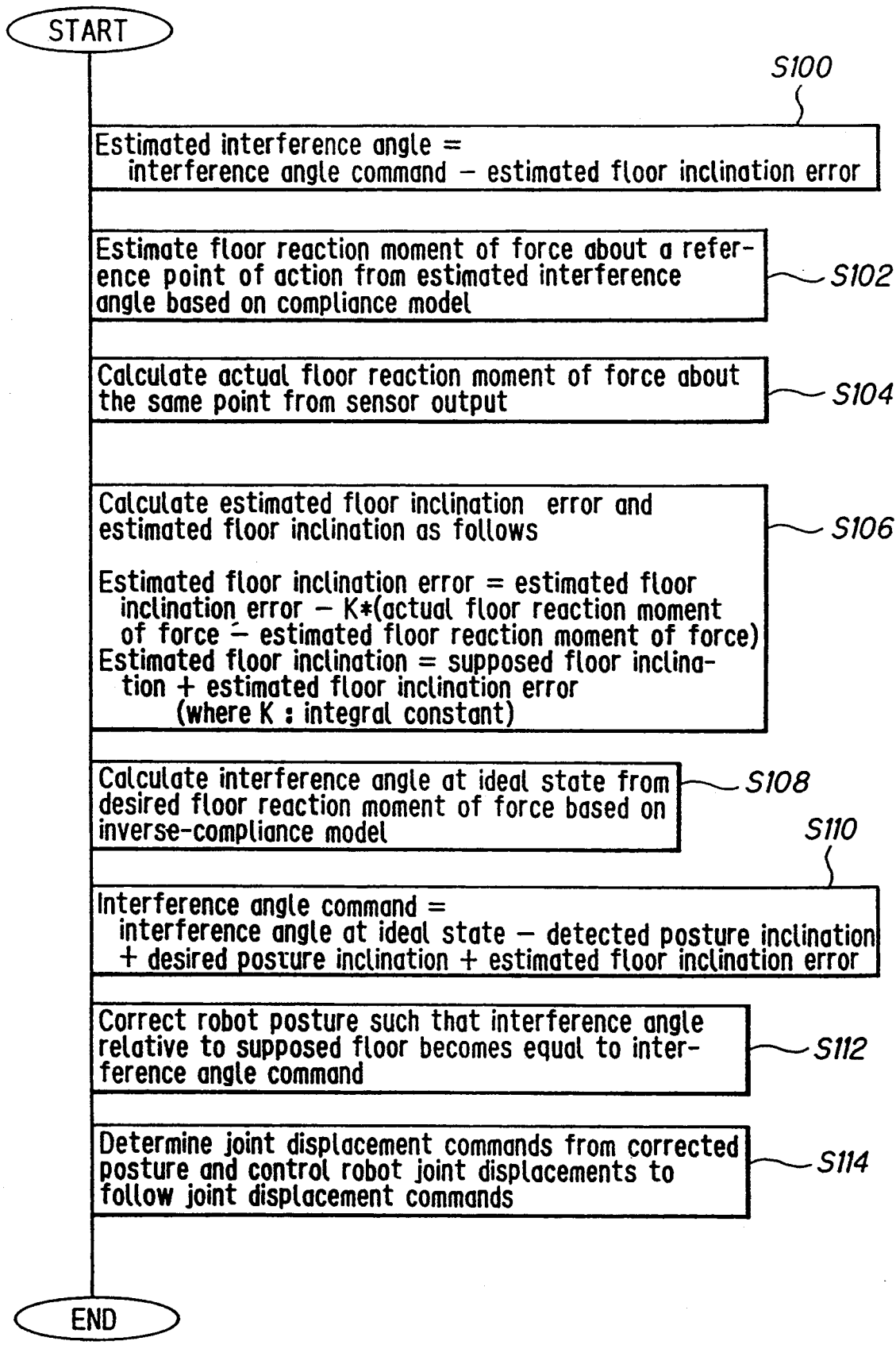
FIG. 11 is a flow chart showing the operation of the system illustrated in FIG. 10.

FIG. 10 is a block diagram showing the structure of a locomotion control system according to a second embodiment of the invention and FIG. 11 is a flow chart showing the operation of the system. The second embodiment differs from the first embodiment in that the estimated interference angle to be input to the compliance model is calculated from a deviation or error between the estimated floor inclination error (initially set to be zero) and the interference angle command as illustrated in the upper right of the block diagram of FIG. 10 and step S100 in the flow chart of FIG. 11.

Since the interference angle command, instead of the detected joint displacements, is used to determine the estimated interference angle, the "compliance behavior" in the second embodiment substantially includes that obtained from the mechanism or link's deformation and that obtained by the control, both. The rest of the structure and operation as well as advantages are the same as the first embodiment.

Figure 12:
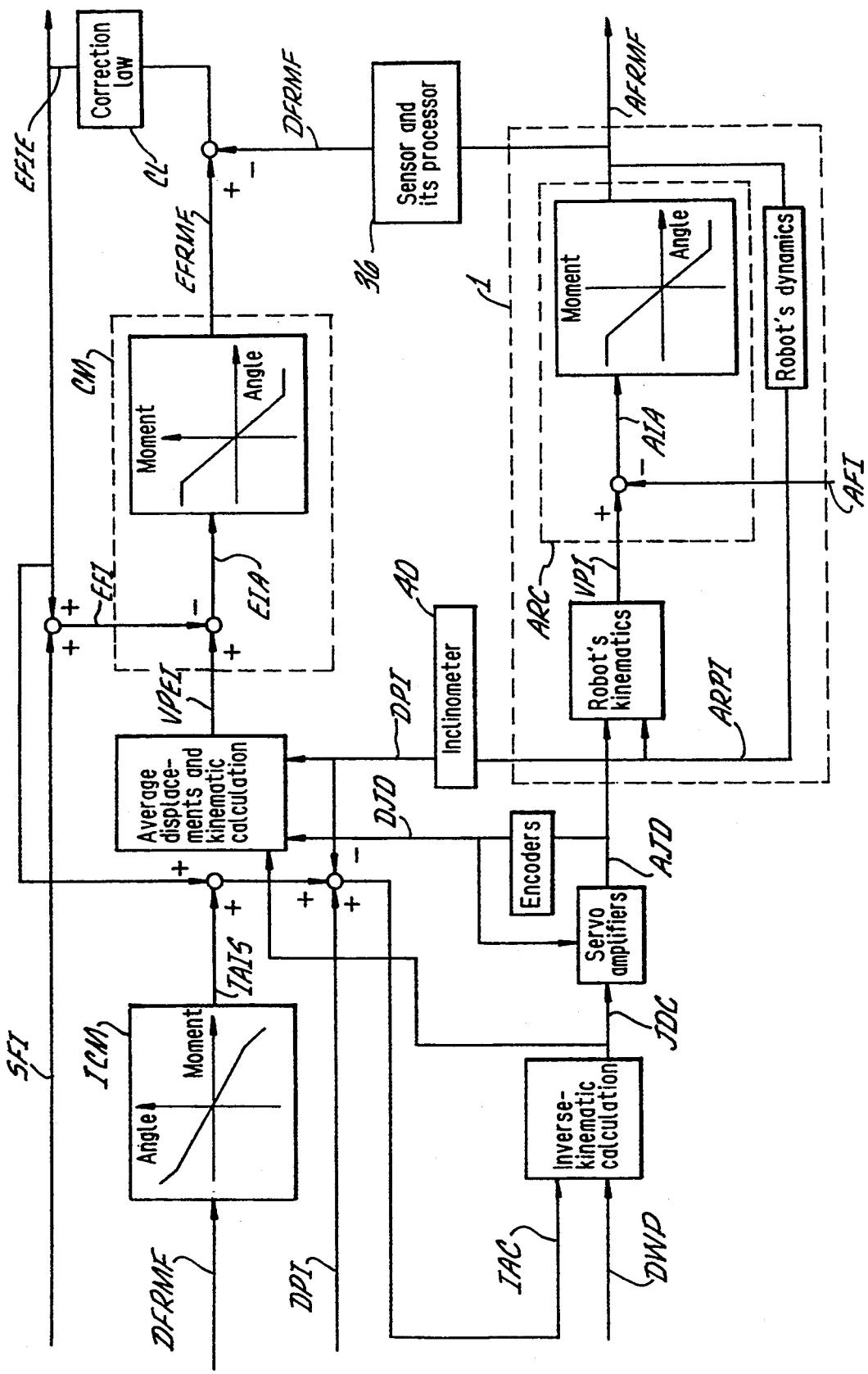
FIG. 12 is a block diagram showing the structure of a locomotion control system according to a third embodiment of the invention.
Figure 13:
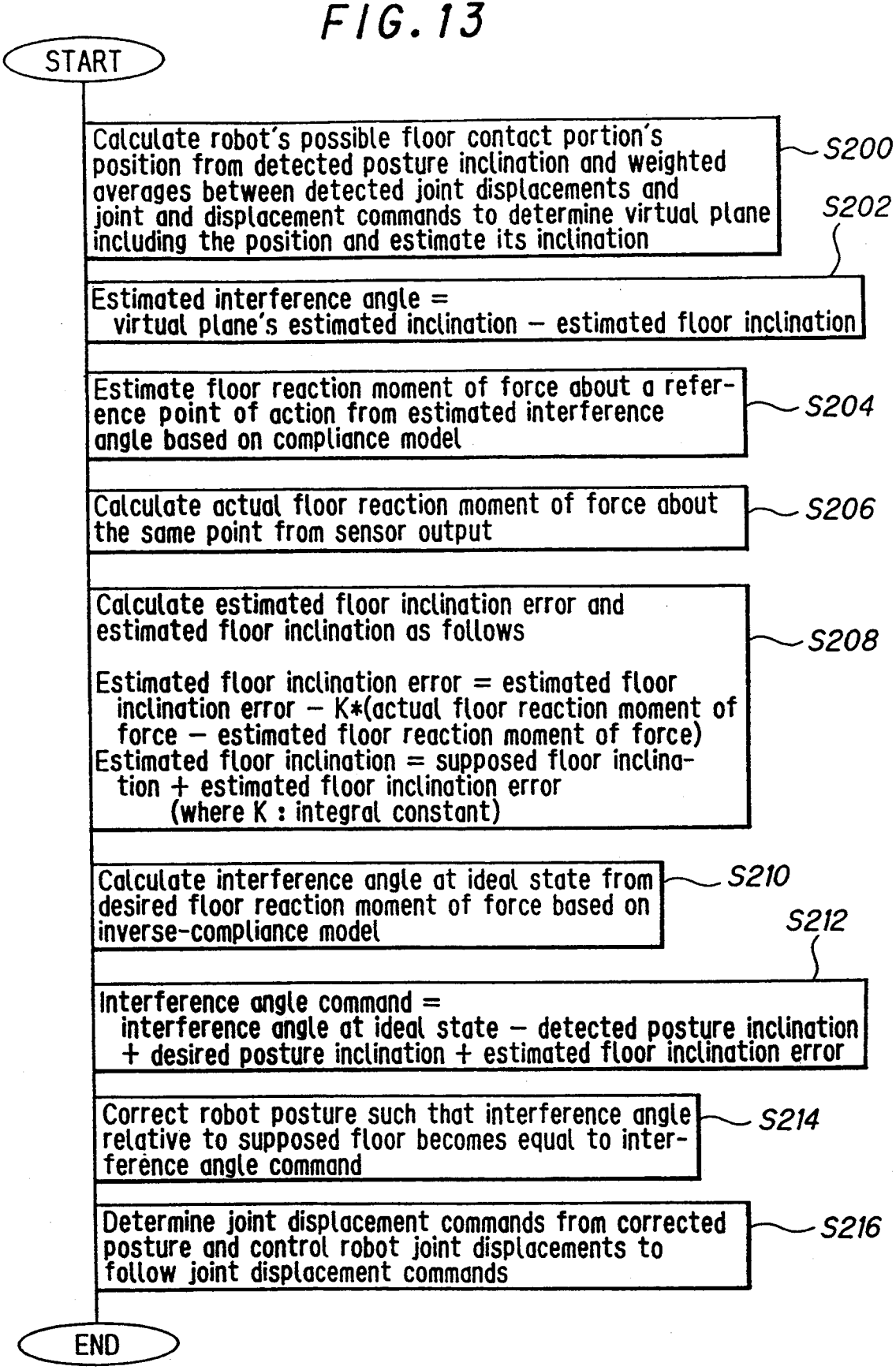
FIG. 13 is a flow chart showing the operation of the system illustrated in FIG. 12.

FIG. 12 is a block diagram showing the structure of a locomotion control system according to a third embodiment of the invention and FIG. 13 is a flow chart showing the operation of the system. The third embodiment differs from the first embodiment in that weighted averages of the detected joint displacements and the joint displacement commands are calculated, and the virtual plane's inclination is estimated from the weighted averages and the detected posture inclination, as illustrated in FIG. 12 and at step S200 in the flow chart of FIG. 13. A coefficient of the weight is determined such that if the detected joint displacement for a certain joint be W(S), the joint displacement command for the joint concerned is (1−W(S)). Preferably, the degree of contribution to the compliance behavior is evaluated for the respective joints and the detected joint displacement's coefficient is determined to be greater for the joint with higher degree while smaller for the joint with lower degree. If doing so, the joint with lower degree can use the displacement command almost as it is in the kinematic calculation so that the amount of kinematic calculation will therefore be decreased. Moreover, it is alternatively possible to take the frequency of the joint displacement behavior into consideration. Furthermore, since high frequency noise may often be mixed in the sensor outputs, it will be more preferable to assign low-pass filtering characteristics to the coefficient W(S). The rest of the structure and operation as well as advantages are the same as the first embodiment. Since the third embodiment's structure is a mixture of the first and second embodiments, the compliance behavior in the embodiment substantially includes that obtained by the mechanism or link's deformation and that obtained from the control.

Figure 14:
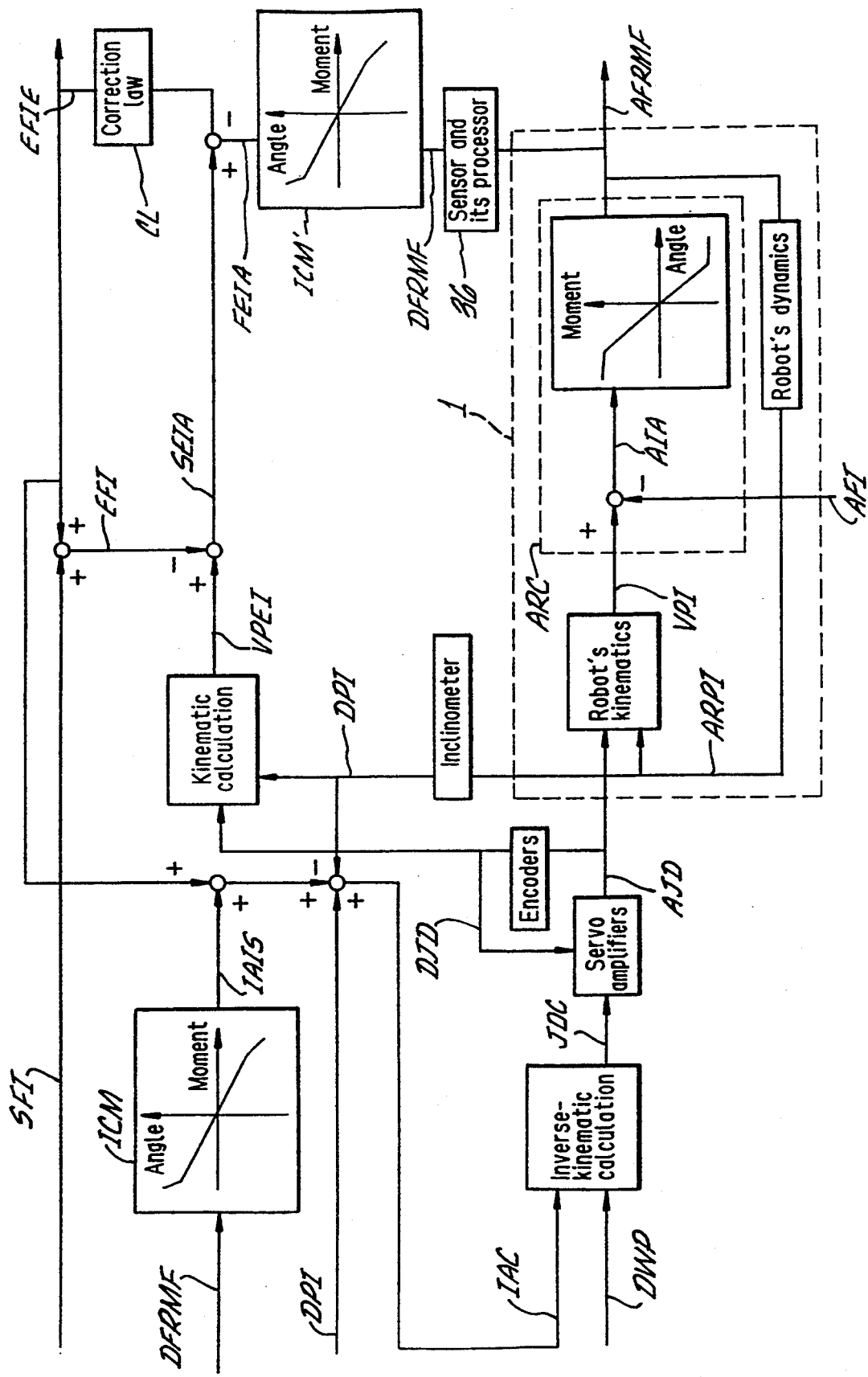
FIG. 14 is a block diagram showing the structure of a locomotion control system according to a fourth embodiment of the invention.

FIG. 14 is a block diagram showing the structure of a locomotion control system according to a fourth embodiment of the invention and FIG. 15 is a flow chart showing the operation of the system. The characteristic feature of the fourth embodiment is that, as illustrated in the upper right of FIG. 14, the estimated interference angle is determined from the actual floor reaction moment of force so as to calculate the estimated floor inclination error, and the estimated floor inclination. More specifically, the six-dimensional force and torque sensor with its processor is followed by the inverse-compliance model ICM' and robot posture is estimated from the detected floor reaction moment of force using the model. The estimated robot posture is defined here as the estimated interference angle, more correctly the "first" estimated interference angle FEIA. While, from the virtual plane's estimated inclination and estimated floor inclination, the aforesaid interference angle, called here as the "second" interference estimated angle SEIA, is calculated in the same manner as the first embodiment. The estimated floor inclination error is determined on the basis of an error or deviation between the second and first interference angles. In order to ensure for the second interference angle be compared with the first interference angle in the same dimension, the compliance model, identical to that shown in FIG. 3, is followed by the inverse-compliance model. Since, however, the product of the two models' transfer functions is 1, they can be canceled with each other and are accordingly omitted from illustration in FIG. 14. The rest of the structure and operation as well as advantages are the same as the first embodiment. It will also be apparent from the structure of the fourth embodiment that the second or third embodiment can be modified to a similar structure such that the estimated floor inclination be obtained from, instead of the floor reaction moment of force, the interference angles.

Figure 16:
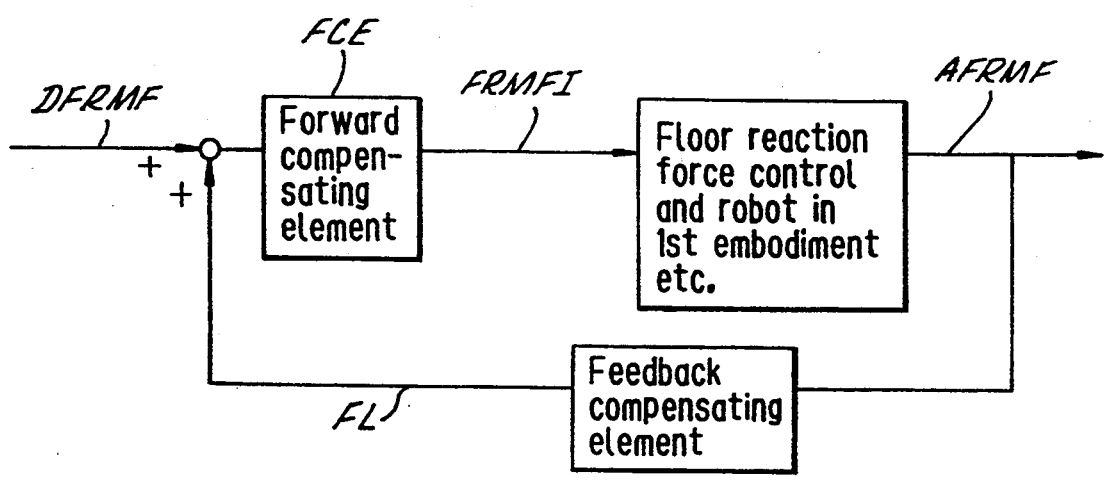
FIG. 16 is a block diagram showing the structure of a locomotion control system according to a fifth embodiment of the invention.

FIG. 16 is a block diagram showing the structure of a locomotion control system according to a fifth embodiment of the invention. The desired floor reaction moment of force DFEMF is modified by a forward compensating element FCE to obtain a floor reaction moment of force input FRMFI to be used in the same manner as in the above-described embodiments. In the embodiment, a floor reaction force's feedback loop FL is added at the outside of posture inclination control discussed from the first to the fourth embodiment. With the arrangement, control accuracy of the floor reaction force is enhanced.

Figure 17:
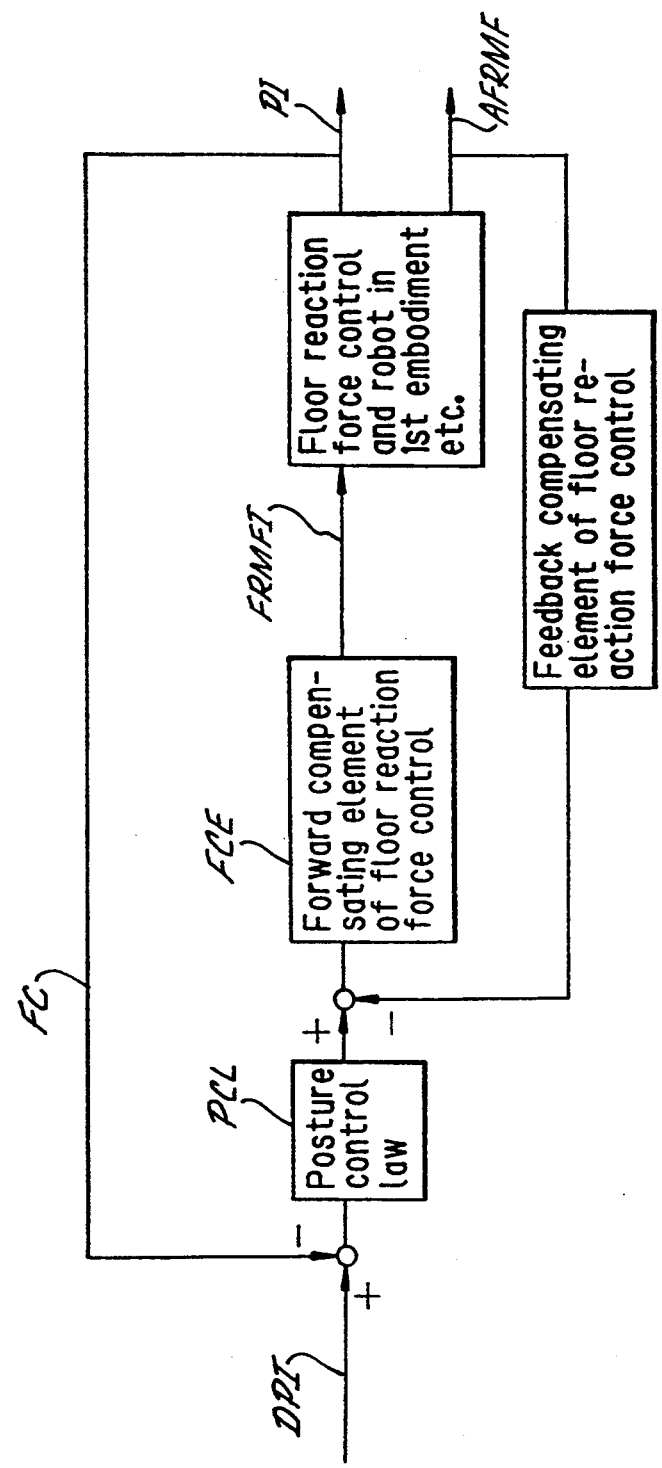
FIG. 17 is a view, similar to FIG. 16, but shows the structure of a locomotion control system according to a sixth embodiment of the invention.
Figure 26:
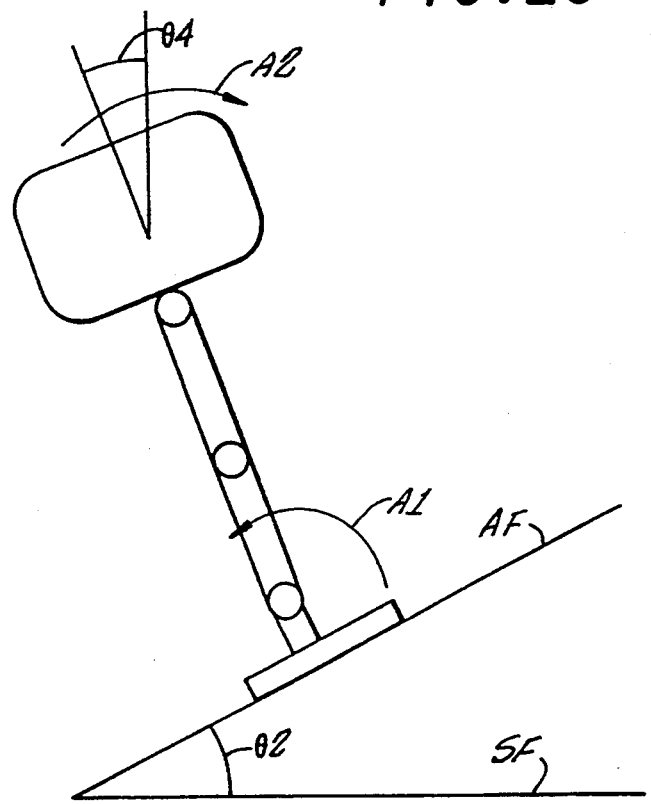
FIG. 26 is a view illustrating the robot that loses its stability on a floor whose configuration is not the same as a floor supposed in a desired walking pattern.
Figure 27:
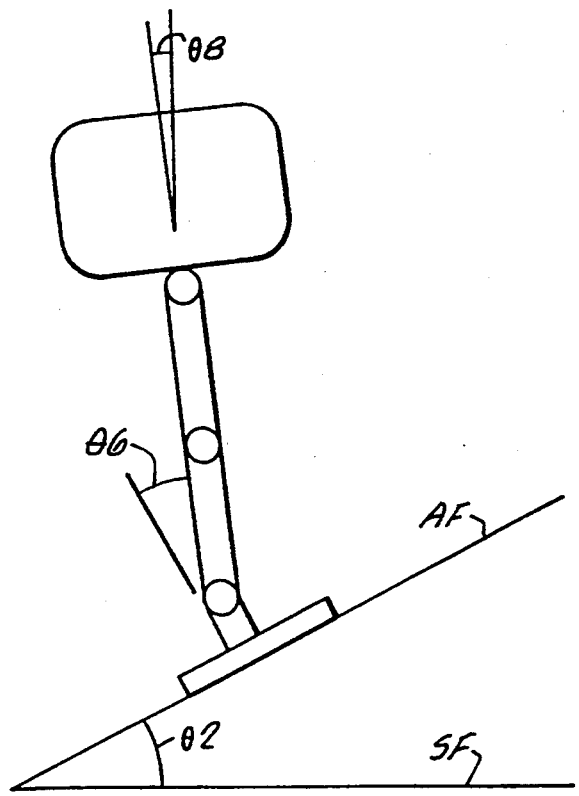
FIG. 27 is a view, similar to FIG. 26, but shows the robot that restores its stability still remaining a steady-state error.

FIG. 17 is a block diagram showing the structure of a locomotion control system according to a sixth embodiment of the invention. In the embodiment, the first embodiment's structure is applied to a minor loop of the posture inclination control and the desired floor reaction moment of force is manipulated in response to the posture inclination. The desired posture inclination DPI is inputted to a posture control law PCL before the forward element FCE. The sixth embodiment's advantages are not only the posture inclination PI is hardly affected by the floor configuration error, but also a steady-state error can be eliminated. As mentioned earlier with respect to FIGS. 26 and 27, the inclinatory error between the supposed and actual floors may result the floor reaction force's error and at that instance, if the robot body's inclination is feedback controlled through FC to a desired value so as to cancel the error, a steady-state error remains. Since the inclinatory error is estimated and canceled and, as was explained with reference to FIG. 9, since the correction law includes the integral element, no steady-error remains. Furthermore, as was explained with respect to FIG. 9, since any element including integral element is not present between the desired floor reaction moment of force (input) and the actual floor reaction moment of force (output), when the desired reaction moment of force is varied, the actual reaction moment of force can immediately respond thereto. Thus, no phase lag occurs so that the system is free from vibration.

Figure 18:
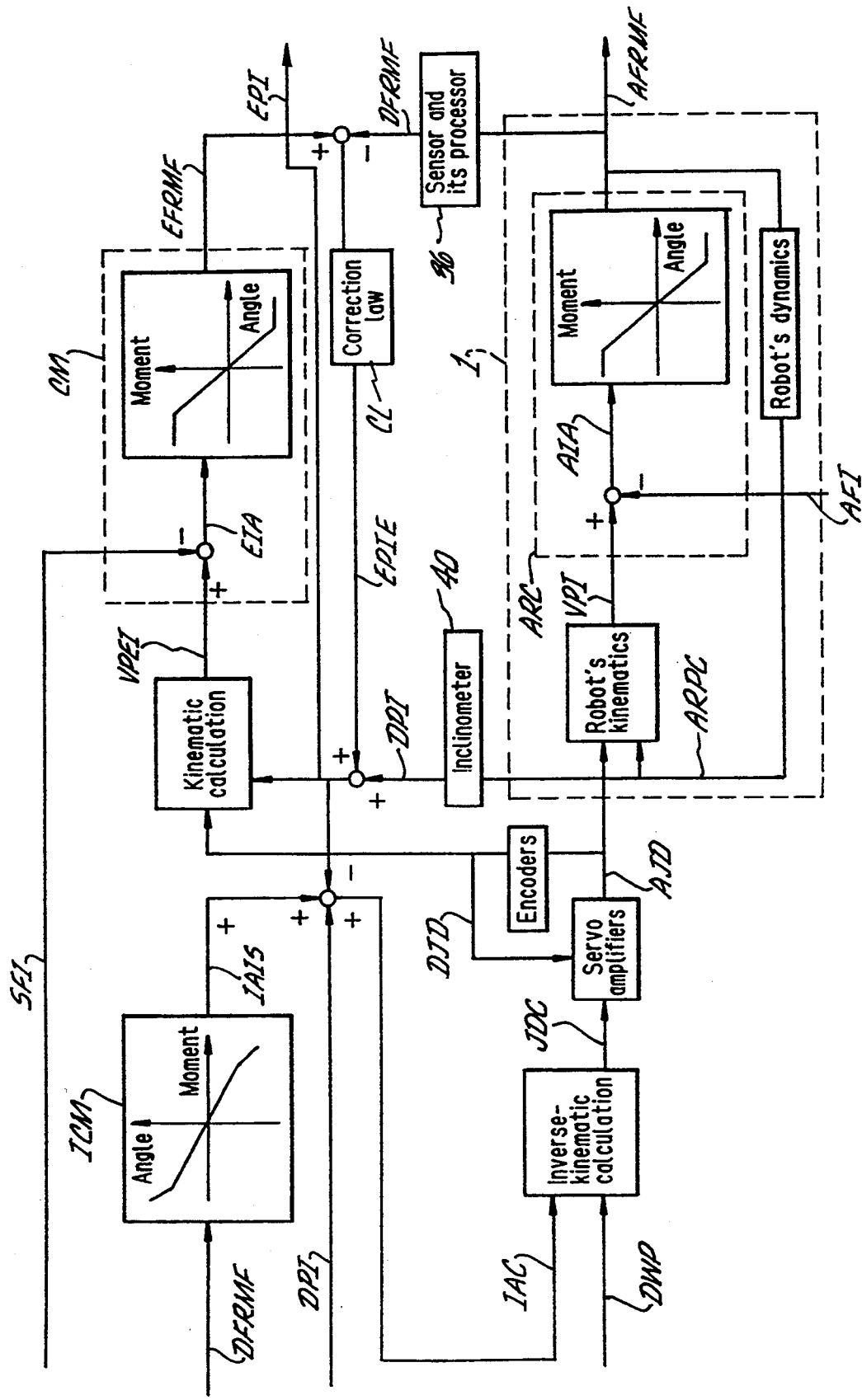
FIG. 18 is a block diagram showing the structure of an inclinometer's output correction system according to a seventh embodiment of the invention.

FIG. 18 is a block diagram showing the structure of an inclinometer's output correction system according to a seventh embodiment of the invention.

Briefing the system, the robot posture is estimated from the output of the inclination (detected posture inclination) and the detected joint displacements and the floor reaction moment of force which should occur if the robot with that posture be in contact with the supposed floor is estimated. The estimated floor reaction moment of force is then compared with floor reaction moment of force actually generated. These are the same as the first embodiment. In the seventh embodiment, however, in response to the error therebetween, it is arranged such that the output of the inclinometer is corrected. Namely, the embodiment is based on the presumption that the supposed floor is known and there is no configuration error between the supposed and actual floors. Therefore, when the estimated floor reaction moment of force EFRMF obtained by the use of the inclinometer's output does not coincide with the actual floor reaction moment of force AFRMF, it is judged that the inclinometer's output constituting the basis of the estimation is improper and should accordingly be corrected.

Figure 19:
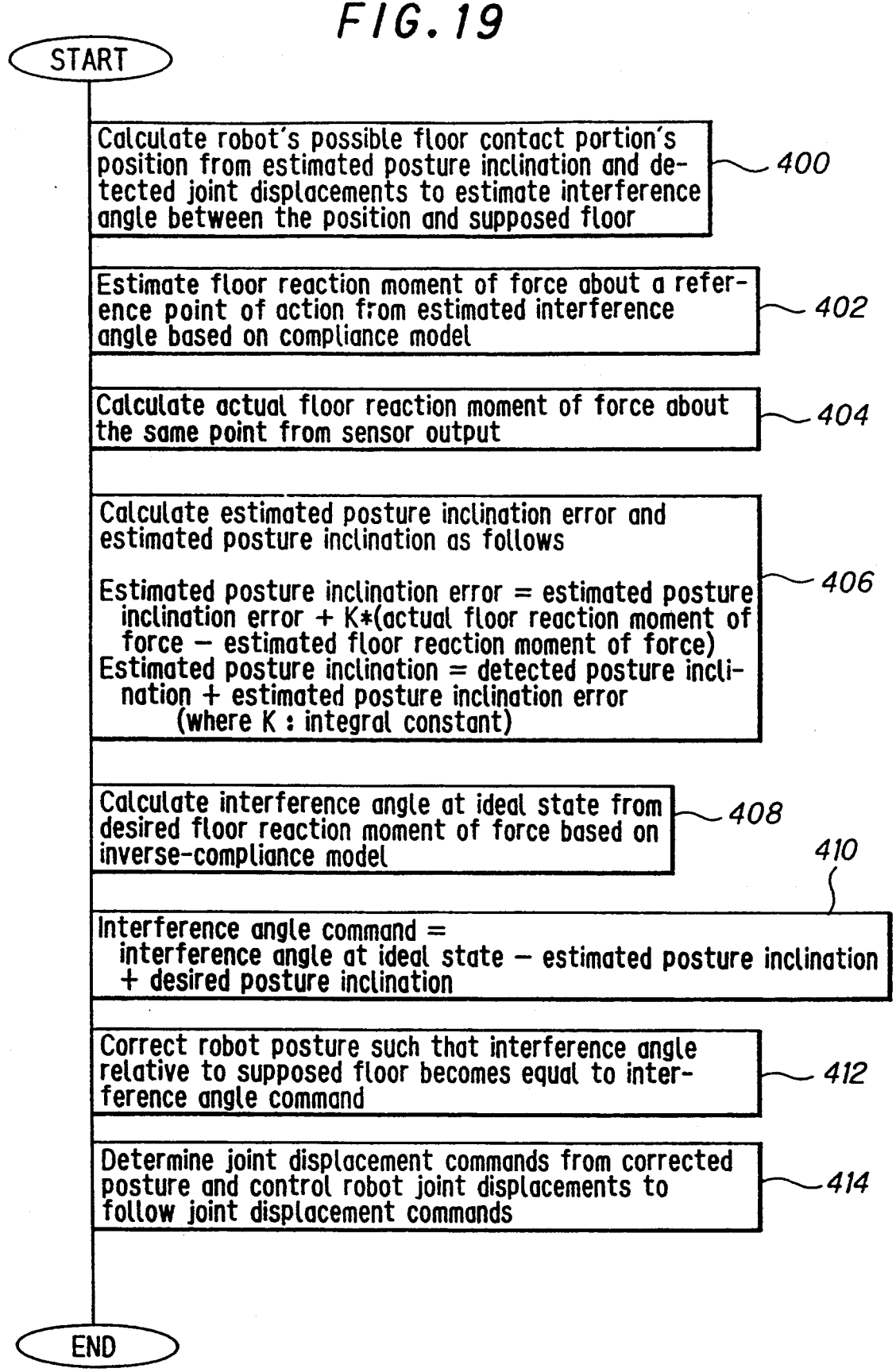
FIG. 19 is a flow chart showing the operation of the system illustrated in FIG. 18.

This will be explained with reference to the flow chart of FIG. 19.

First at step S400, the virtual plane's inclination is estimated in the same manner as the first embodiment and the error between the virtual floor's estimated inclination and the supposed floor inclination is calculated. The error is deemed as the estimated interference angle EIA.

Program then advances to step S402 in which floor reaction moment of force about a reference point of action such as the desired ZMP is estimated from the estimated interference angle in accordance with the compliance model CM, to step S404 in which actual floor reaction moment of force about the same point is detected from the output of the six-dimensional force and torque sensor. Program next advances to step S406 in which estimated posture inclination error EPIE and estimated posture inclination are calculated in a manner similar to the first embodiment. Here the value "estimated posture inclination error" indicates the value for the inclinometer's output correction. Therefore, in response to the value the inclinometer will be corrected in a subroutine not disclosed.

Program then goes to step S408 in which the interference angle at ideal state IAIS is calculated, to step S410 in which the interference angle command IAC is calculated, to steps S412 and S414 in which joint displacement control is conducted in the same manner as the first embodiment. It should be noted that the steps S408 to S414 are not necessary for the inclinometer output's correction.

With the arrangement, it becomes possible to accurately correct a drift, if happened, of the inclinometer output provided that the robot on which the inclinometer is mounted walks on a floor identical to the supposed floor in configuration. A floor such as an office building's is substantially level, although there are fine bumps, when viewed from an averaged inclinatory angle of a relatively broad area. The system is therefore most suitable for the correction at such a place.

Figure 20:
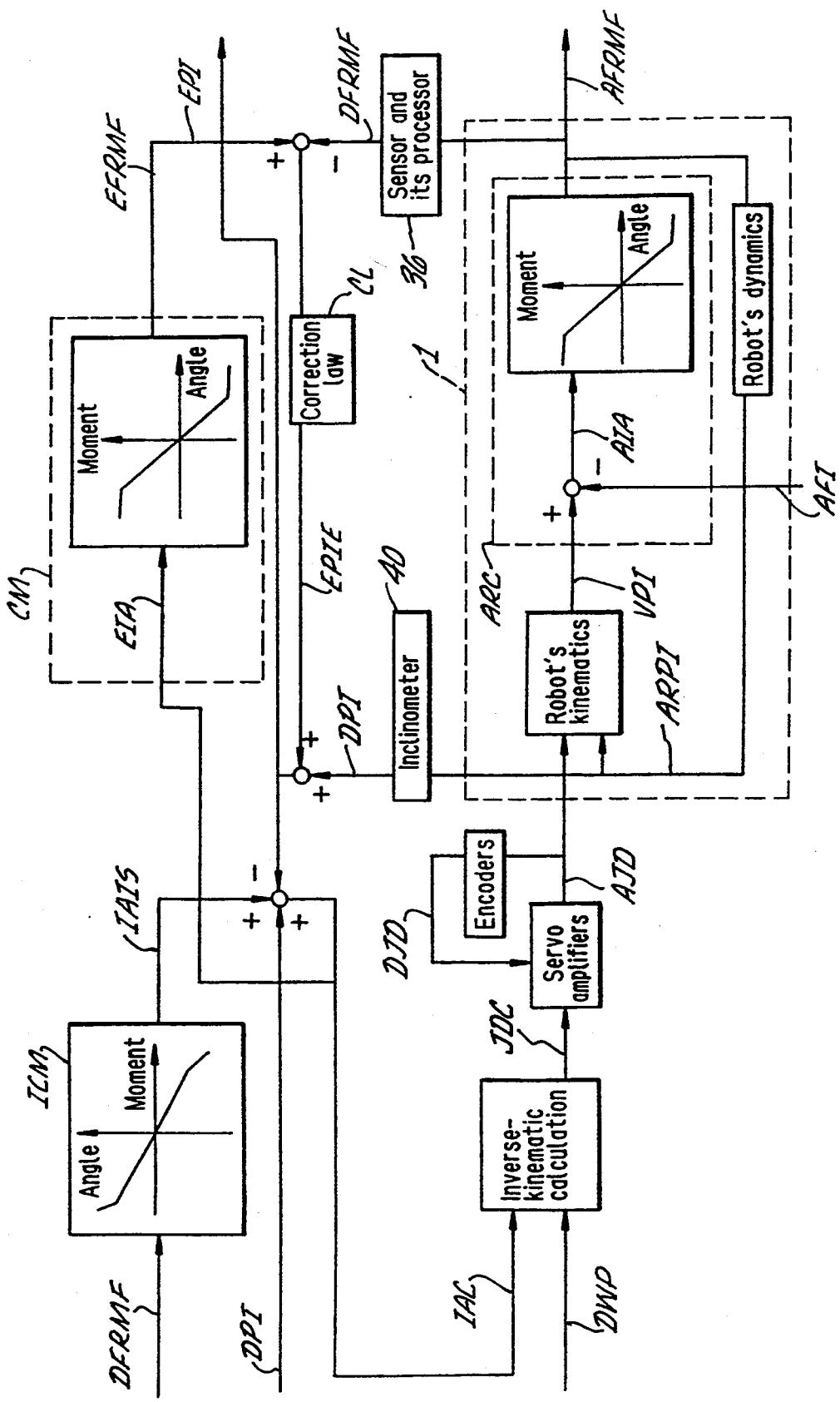
FIG. 20 is a block diagram showing the structure of an inclinometer's output correction system according to an eighth embodiment of the invention.
Figure 21:
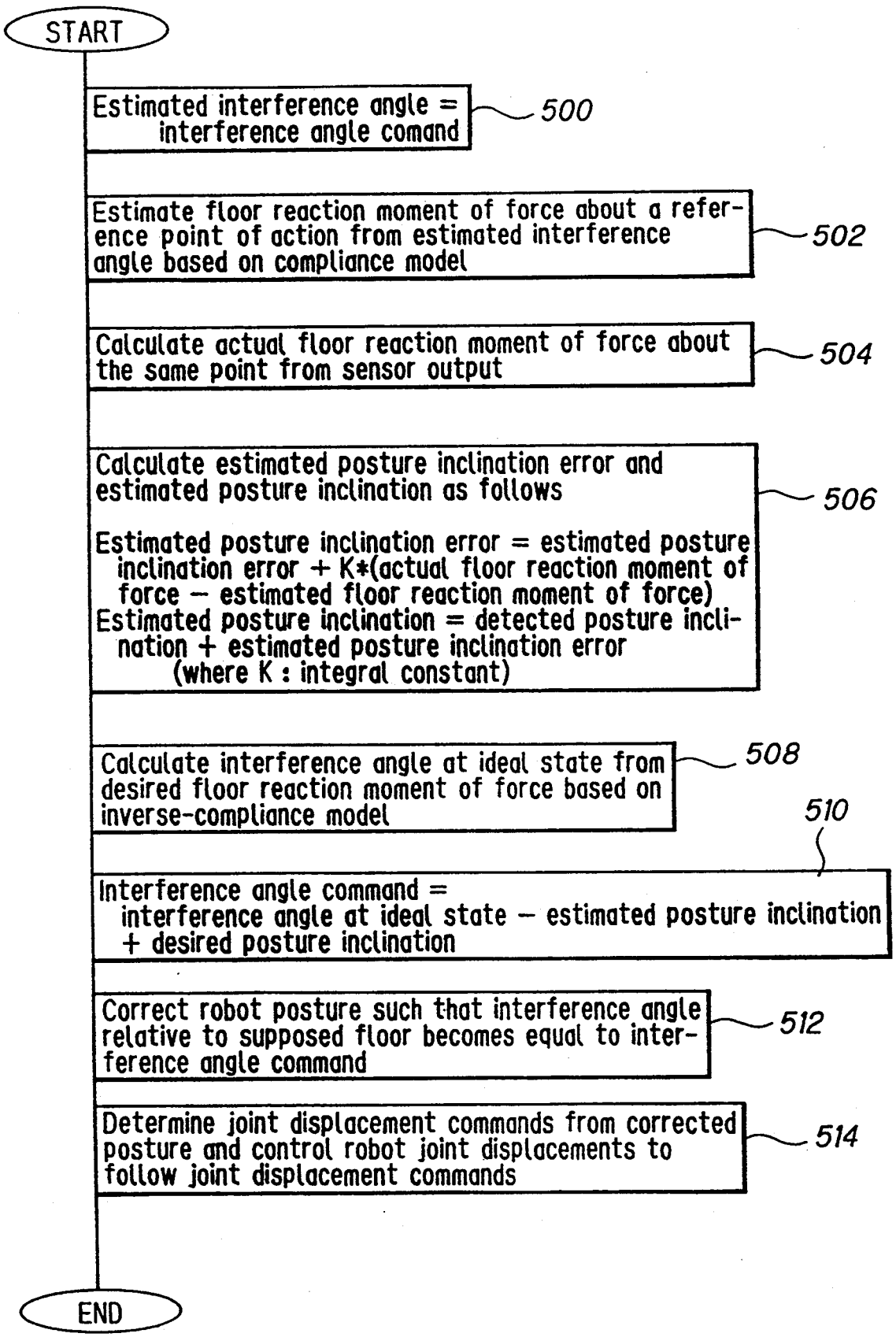
FIG. 21 is a flow chart showing the operation of the system illustrated in FIG. 20.

FIG. 20 is a block diagram showing the structure of an inclinometer's output correction system according to an eighth embodiment of the invention and FIG. 21 is a flow chart showing the operation of the system. The eighth embodiment differs from the seventh embodiment in that the interference angle command is used as the estimated interference angle to be input to the compliance model just like as the second embodiment. The rest of the structure and operation as well as advantages are same as the second and seventh embodiments.

Figure 22:
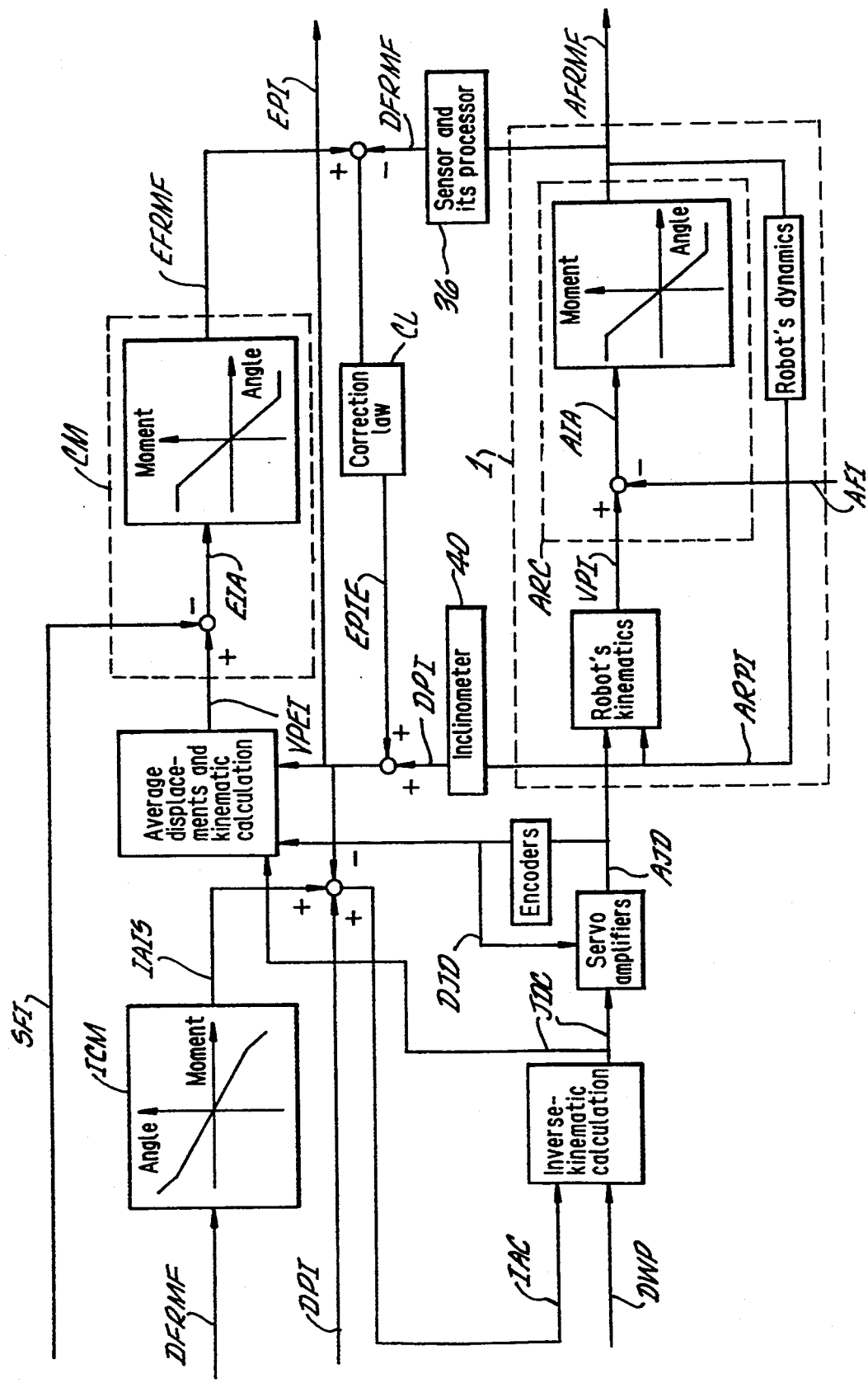
FIG. 22 is a block diagram showing the structure of an inclinometer's output correction system according to a ninth embodiment of the invention.
Figure 23:
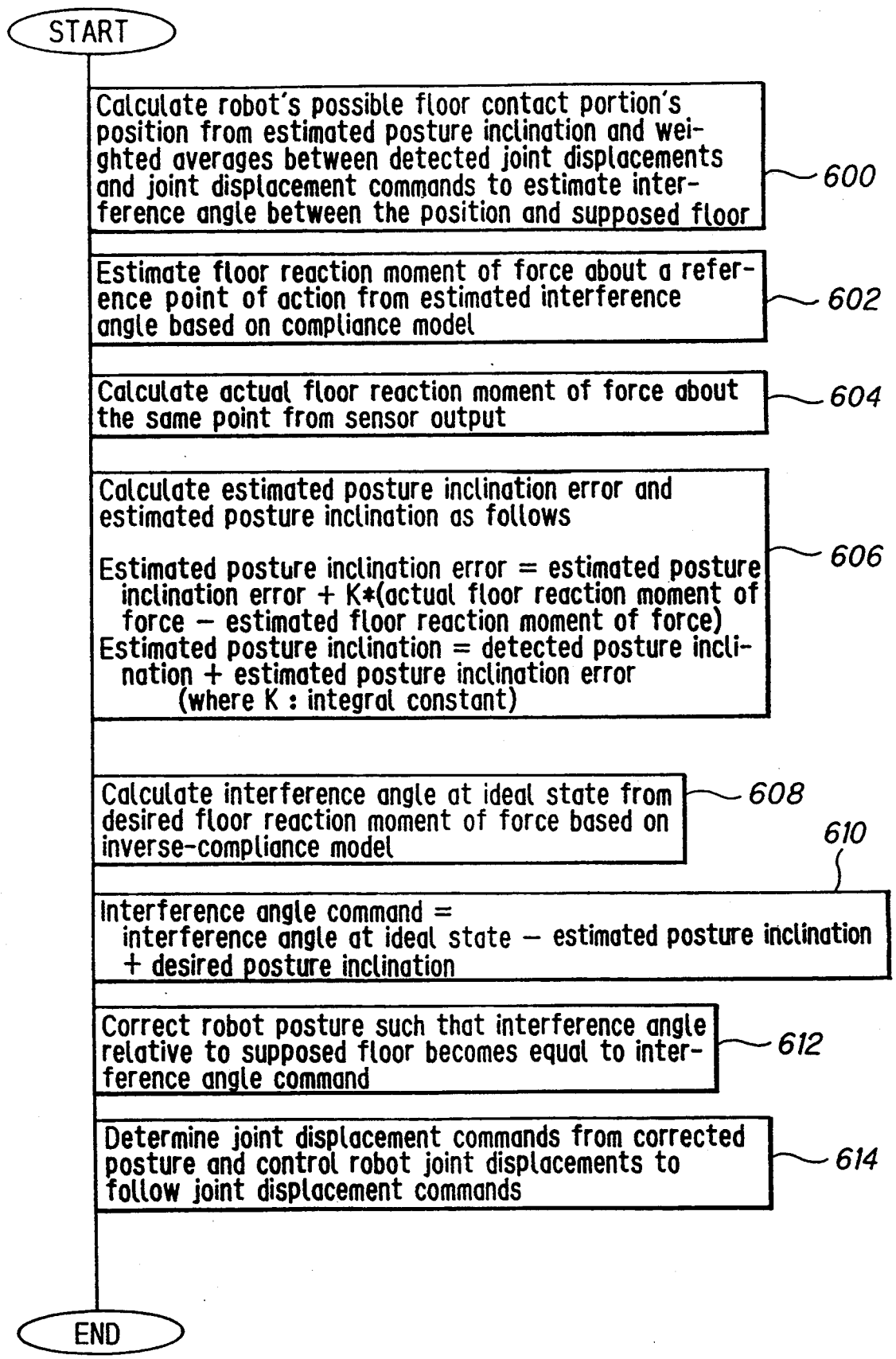
FIG. 23 is a flow chart showing the operation of the system illustrated in FIG. 22.

FIG. 22 is a block diagram showing the structure of an inclinometer's output correction system according to a ninth embodiment and FIG. 23 is a flow chart showing the operation of the system. The characteristic feature of the embodiment is that, like the third embodiment, the virtual plane's inclination is estimated using the weighted averages of the detected joint displacements and joints displacement commands. The other structure and operation as well as advantages are same as the third and seventh embodiments.

Figure 24:
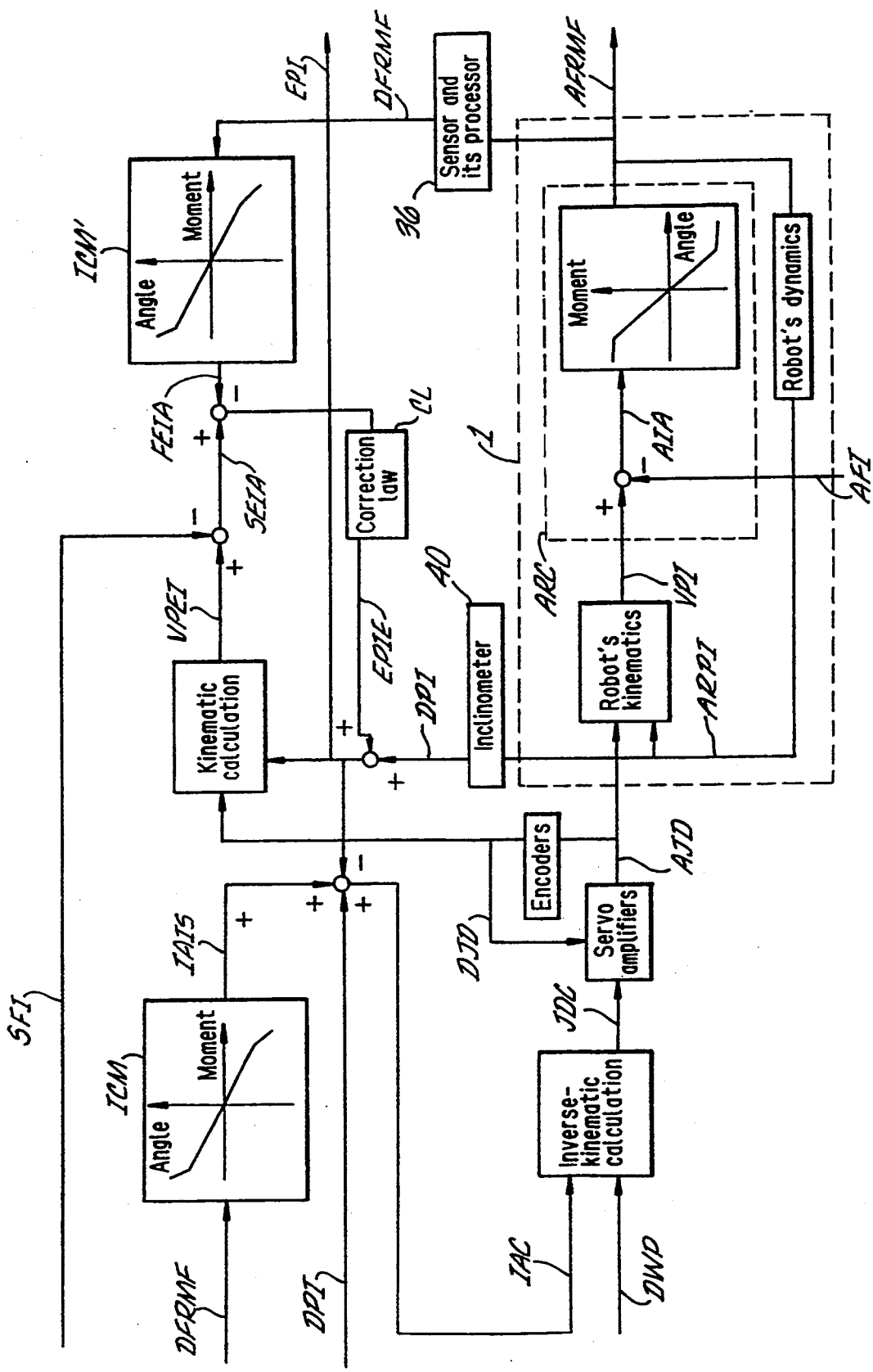
FIG. 24 is a block diagram showing the structure of an inclinometer's output correction system according to a tenth embodiment of the invention.
Figure 25:
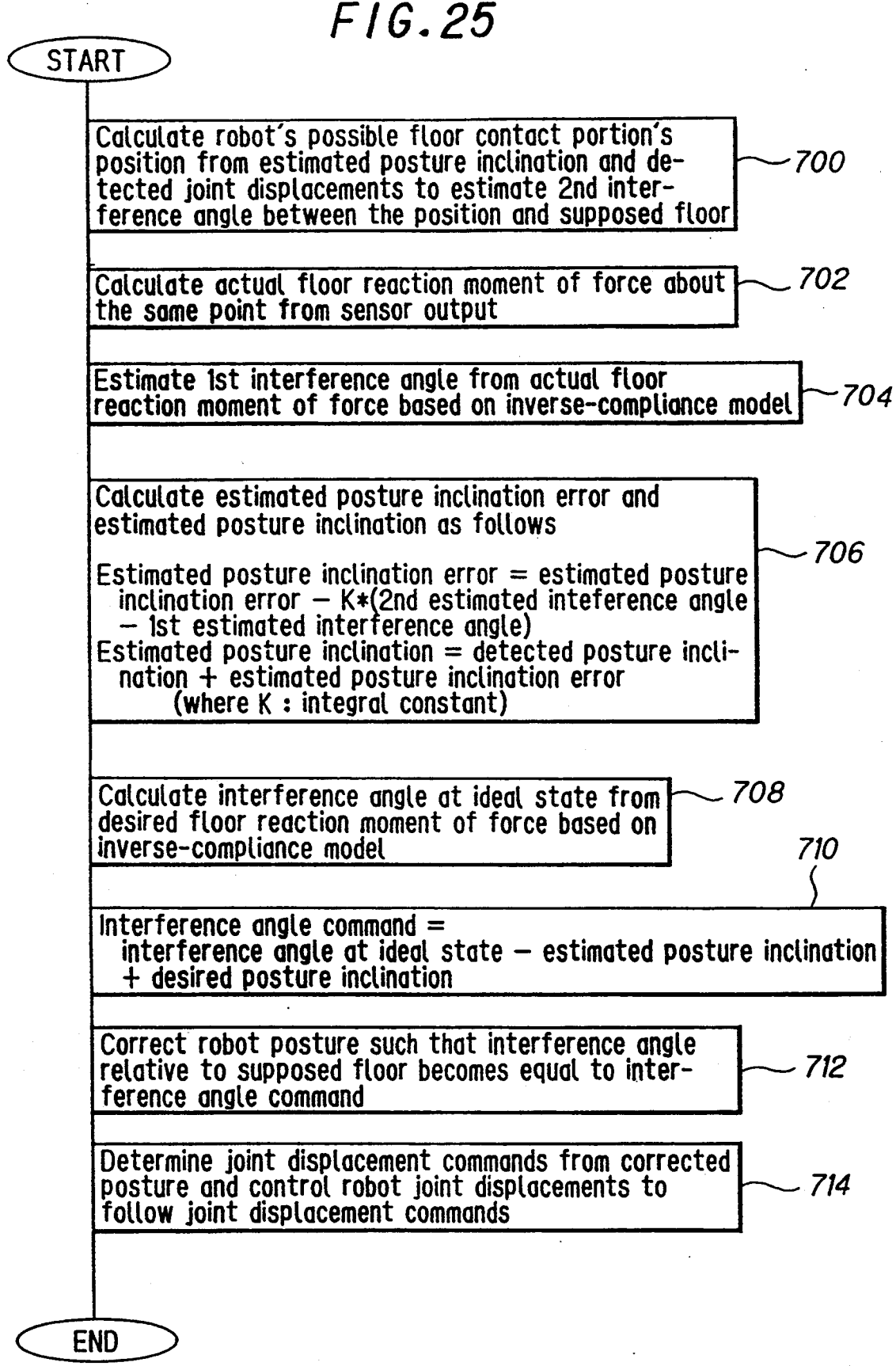
FIG. 25 is a flow chart showing the operation of the system illustrated in FIG. 24.

FIG. 24 is a block diagram showing the structure of an inclinometer's output correction system according to a tenth embodiment of the invention and FIG. 25 is a flow chart showing the operation of the system. The characteristic feature of the embodiment is that, similarly to the fourth embodiment, the estimated interference angle is obtained from floor reaction moment of force and the posture inclination error is therefore estimated therefrom. The others are the same as the fourth and seventh embodiments.

It should be noted here that from the first to tenth embodiments, at the time of calculating the joint displacements of the corrected posture from the interference angle command and desired walking pattern, it is alternatively possible, during the one leg support phase, to calculate the displacement such that the value for the support leg's ankle joint is only corrected from that calculated from the desired walking pattern. If doing so, the amount of inverse-kinematic calculation will be greatly decreased. During the two leg support phase, although the total floor reaction moment of force generated for the two legs are ordinarily controlled as experienced in the foregoing embodiments, it is alternatively possible to separately control each leg's floor reaction moment of force and if doing so, it suffice to control the leg's interference angle concerned. At that instance, however, since controls for individual legs may interfere with each other, control will therefore be degraded.

In some of the foregoing embodiments the configuration of floor (posture inclination) is estimated by comparing the estimated floor reaction force with the detected floor reaction force. Generally speaking, the floor reaction force is expressed by force, moment of force and a point of action as earlier mentioned, or the ZMP, force acting at the ZMP and moment of force acting about normal axis to the floor. No matter which expression is used, since all the components do not always relate to the posture control, it suffice to detect only a component(s) required as was conducted in the embodiments. And it suffice to configure the model such that it generates least outputs necessary for the purpose. The model may be configured such that it outputs an error between the ZMP defining floor reaction force of the model and the desired ZMP. The reference point of action may be set at a certain portion of the robot, such as the ankle (the intersection of the ankle joints 18, 20 R(L)). This means that if moment of force acting on the ankle can be replaced with the floor reaction moment of force used in the embodiments, ankle joint's moment of force control will be realized.

In the foregoing embodiments, although the error in configuration between the supposed and actual floors is determined in terms of angle, it may be expressed, for example, by a difference in floor level. In the foregoing embodiments, if doing so, however, the level difference will eventually be estimated as a difference of averaged inclinations. If the actual floor is known in advance, e.g. it has a level difference although it has no inclination change, or it is moderately inclined without any level difference, as the parameter to be estimated the level difference or inclination may be chosen in accordance with the situation. It should be noted, at any rate, that if the inclination error is estimated as experienced in the embodiments, the interference angle in the walking pattern will be corrected, while if floor level difference is estimated, leg's floor contact portion's height will then be corrected. It should further be noted that, although the inclination is expressed in terms of angle, it may alternatively be expressed in terms of angular velocity or linear combination of angle and angular velocity.

In the foregoing embodiments, if impact occurs at foot landing, since floor reaction force changes so greatly that it becomes difficult to estimate the force accurately. At that instance, the gain K should preferably be set to be a small value or zero. The floor reaction force in the gravitational direction becomes least or zero at a condition such as the free leg phase or when the robot jumps. At such a case, the gain K should preferably be set to be least or zero. At such instance, it is advisable to set the estimated floor inclination error to zero or to be decreased gradually to zero.

During the one leg support phase, the maximum floor reaction moment of force is limited to a critical value determined by the foot sole's floor contact area and the magnitude of the gravitational floor reaction force and hence it has a non-linear characteristics as illustrated in the compliance of FIG. 3. The characteristics of the inverse-compliance model becomes also non-linear. When the desired floor reaction force becomes great, its output indicative of the interference angle enlarges rapidly. Since it is not desirable that the interference angle becomes too great, the inverse-compliance model should preferably be followed by a limiter such that the interference angle is limited to a certain value even when the desired floor reaction force becomes great. Alternatively, the inverse compliance model may be configured to have linear characteristics so as to prevent the interference angle from becoming large rapidly.

The characteristics of compliance behavior vary with the phases of locomotion, i.e., the one leg support phase and two leg support phase. It is therefore preferable to vary the compliance model's characteristics in accordance with the locomotion phase to improve estimation accuracy of the floor configuration error.

In the foregoing embodiments, the compliance model is assigned with the spring characteristics alone. However, it is possible to configure the model with damper characteristics when the robot has the damper characteristics.

In the foregoing embodiments, when it has been known that the floor inclines moderately, after predicting the floor inclinations at the next walking step, the desired walking at the next walking step itself may by corrected at a real time in response to the predicted inclination.

In the floor inclination's estimation thus mentioned, after the estimated error has once converged by the correction law, the estimated error should vary no more. As a matter of fact, however, if the compliance model is different from the actual robot's compliance, the floor reaction force's change causes the estimated error's correction to malfunction and as a result, the estimated error varies. When the correction law is comprised of integral element and low-pass filtering characteristics, the correction law's malfunction results a lag in the floor reaction force control and if worst comes to worst, the system vibration occurs. The problem can however be solved by conducting adaptive control in which the actual robot's compliance is identified and the compliance model is adjusted by the identified value. In the adaptive control, the variation of the estimated floor, reaction force outputted by the compliance model at the time the actual floor reaction force varies is observed and the amount of variation is identified such that it becomes equal to that of the actual robot.

While the invention was described with reference to a biped walking robot as an example of the legged mobile robot, the invention can be applied not only to a legged robot other than the biped one, but also any other robots of wheeled or crawler type.

Furthermore, the invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling locomotion of a legged mobile robot having a body and a plurality of legs each connected to the body, comprising;

first means for modeling the robot as a rigid linkage mechanism and establishing desired walking pattern supposing a floor such that the robot walks on the supposed floor;

second means for detecting actual inclination of the robot posture when the robot walks;

third means for determining the posture of the robot at least from the detected actual inclination of the robot posture on the assumption that the robot does not exhibit compliance behavior intrinsically assigned thereto;

fourth means for determining a relative relationship between the determined robot posture and the supposed floor;

fifth means for estimating, in accordance with a predetermined characteristic, floor reaction force which could act to the robot should the robot change its posture by virtue of the compliance behavior intrinsically assigned thereto such that at least a possible floor contact portion is in contact with the supposed floor;

sixth means for detecting floor reaction force that actually acts to the robot;

seventh means for determining an error between the estimated floor reaction force and the detected actual floor reaction force; and eighth means for correcting the supposed floor in response to the determined error.

2. A system according to claim 1, wherein said eighth means corrects the desired walking pattern on the basis of the corrected supposed floor.

3. A system according to claim 2, wherein said eighth means corrects the desired walking pattern such that the detected actual floor reaction force coincides with desired floor reaction force.

4. A system according to claim 3, wherein said eighth means corrects the desired walking pattern by virtually rotating the possible floor contact portion of the desired walking pattern by an amount corresponding to the error.

5. A system according to claim 1, wherein said seventh means includes a feedback loop such that the error is decreased.

6. A system according to claim 5, wherein the feedback loop includes an integral element.

7. A system according to claim 3, wherein said seventh means includes a feedback loop such that the error is decreased.

8. A system according to claim 7, wherein the feedback loop is provided outside of a control loop starting from the desired floor reaction force and ending at the actual floor reaction force.

9. A system according to claim 1, further including ninth means for detecting joint displacements of the robot and said third means determines the posture of the robot from the detected actual inclination of the robot posture and the detected joint displacements.

10. A system according to claim 1, further including tenth means for calculating averages of the detected joint displacement and joint displacement commands and said third means determines the posture of the robot from the detected actual inclination of the robot posture and the averages of the detected joint displacements and joint displacement commands.

11. A system for controlling locomotion of a legged mobile robot having a body and a plurality of legs each connected to the body, comprising;
- first means for modeling the robot as a rigid linkage mechanism and establishing desired walking pattern supposing a floor such that the robot walks on the supposed floor;
- second means for detecting actual inclination of the robot posture when the robot walks;
- third means for determining the posture of the robot at least from the detected actual inclination of the robot posture to determine a first relative relationship between the determined robot posture and the supposed floor;
- fourth means for detecting floor reaction force that actually acts to the robot;
- fifth means for determining, from the detected actual floor reaction force in accordance with a preestablished characteristic, a second relative relationship between the determined robot posture and the supposed floor; and
- sixth means for determining an error between the first and second relative relationships to correct the supposed floor in response to the error.

12. A system according to claim 11, wherein said sixth means corrects the desired walking pattern on the basis of the corrected supposed floor.

13. A system according to claim 12, wherein said sixth means corrects the desired walking pattern such that the actual floor reaction force coincides with desired floor reaction force.

14. A system according to claim 13, wherein said sixth means corrects the desired walking pattern by virtually rotating a possible floor contact portion of the desired walking pattern by an amount corresponding to the error.

15. A system according to claim 11, wherein said sixth means includes a feedback loop such that the error is decreased.

16. A system according to claim 15, wherein the feedback loop includes an integral element.

17. A system according to claim 13, wherein said seventh means includes a feedback loop such that the error is decreased.

18. A system according to claim 17, wherein the feedback loop is provided outside of a control loop starting from the desired floor reaction force and ending at the actual floor reaction floor.

19. A system according to claim 11, further including seventh means for detecting joint displacements of the robot and said third means determines the posture of the robot from the detected inclination and the detected joint displacements.

20. A system according to claim 11, further including eighth means for calculating averages of the detected joint displacement and said third means determines the posture of the robot from the detected inclination and the averages of the detected joint displacements and joint displacement commands.

21. A system for correcting output of an inclinometer mounted on a legged mobile robot having a body and a plurality of legs each connected to the body, comprising;
- first means for modeling the robot as a rigid linkage mechanism and establishing desired walking pattern supposing a floor such that the robot walks on the supposed floor;
- second means for detecting actual inclination of the robot posture through the inclinometer when the robot walks;
- third means for determining the posture of the robot at least from the detected actual inclination of the robot posture on the assumption that the robot does not exhibit compliance behavior intrinsically assigned thereto;
- fourth means for determining a relative relationship between the determined robot posture and the supposed floor;
- fifth means for estimating, in accordance with a predetermined characteristics, floor reaction force which could act to the robot should the robot change its posture by virtue of the compliance behavior intrinsically assigned hereto such that at least a possible floor contact portion is in contact with the supposed floor;
- sixth means for detecting floor reaction force that actually acts to the robot; and
- seventh means for determining an error between the estimated floor reaction force and the detected actual floor reaction force to correct an output of the inclinometer in response to the error.

22. A system according to claim 21, further including eighth means for detecting joint displacements of the robot and said third means determines the posture of the robot from the detected inclination and the detected joint displacements.

23. A system according to claim 21, further including ninth means for calculating averages of the detected joint displacement and said third means determines the posture of the robot from the detected inclination and the averages of the detected joint displacements and joint displacement commands.

24. A system for correcting output of an inclinometer mounted on a legged mobile robot having a body and a plurality of legs each connected to the body, comprising;
- first means for modeling the robot as a rigid linkage mechanism and establishing desired walking pattern supposing a floor such that the robot walks on the supposed floor;
- second means for detecting actual inclination of the robot posture through the inclinometer when the robot walks;
- third means for determining the posture of the robot at least from the detected actual inclination of the robot posture to determine a first relative relationship between the determined robot posture and the supposed floor;
- fourth means for detecting floor reaction force that actually acts to the robot;

fifth means for determining, from the detected actual floor reaction force in accordance with a preestablished characteristic, a second relative relationship between the determined robot posture and the supposed floor; and sixth means for determining an error between the first and second relative relationships to correct the output of the inclinometer in response to the error.

25. A system according to claim 24, further including seventh means for detecting joint displacements of the robot and said third means determines the posture of the robot from the detected inclination and the detected joint displacements.

26. A system according to claim 24, further including ninth means for calculating averages of the detected joint displacement and said third means determines the posture of the robot from the detected inclination and the averages of the detected joint displacements and joint displacement commands.

* * * * *